US012793725B2

(12) United States Patent
Skordilis et al.

(10) Patent No.: US 12,793,725 B2
(45) Date of Patent: Nov. 10, 2026

(54) SAMPLE GENERATION BASED ON JOINT PROBABILITY DISTRIBUTION

(71) Applicant: QUALCOMM Incorporated, San Diego, CA (US)

(72) Inventors: Zisis Iason Skordilis, San Diego, CA (US); Vivek Rajendran, San Diego, CA (US); Tushar Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 18/718,717

(22) PCT Filed: Nov. 16, 2022

(86) PCT No.: PCT/US2022/079945
§ 371 (c)(1),
(2) Date: Jun. 11, 2024

(87) PCT Pub. No.: WO2023/133011
PCT Pub. Date: Jul. 13, 2023

(65) Prior Publication Data

US 2025/0046323 A1 Feb. 6, 2025

(30) Foreign Application Priority Data

Jan. 7, 2022 (GR) .............................. 20220100011

(51) Int. Cl.
*G10L 19/09* (2013.01)
*G10L 25/12* (2013.01)
*G10L 25/30* (2013.01)

(52) U.S. Cl.
CPC .............. *G10L 19/09* (2013.01); *G10L 25/12* (2013.01); *G10L 25/30* (2013.01)

(58) Field of Classification Search
CPC ......... G10L 19/09; G10L 25/12; G10L 25/30; G10L 19/04
See application file for complete search history.

(56) References Cited

U.S. PATENT DOCUMENTS 5,335,277 A 8/1994 Harvey et al.
6,721,700 B1 * 4/2004 Yin ......................... G10L 19/04 704/219

(Continued)

OTHER PUBLICATIONS

Christoph W., "How do you Generate Synthetic Data?", Statice, Statice.ai, Feb. 13, 2021, XP093017671, pp. 1-10, Abstract, Figures 1-3, p. 1, 7.

(Continued)

*Primary Examiner* — Michael Colucci
(74) *Attorney, Agent, or Firm* — QUALCOMM Incorporated; Espartaco Diaz Hidalgo

(57) ABSTRACT

A device includes a neural network and a sample generator. The neural network is configured to process one or more neural network inputs to generate a joint probability distribution. The one or more neural network inputs include at least first previous sample data and second previous sample data associated with at least one previous data sample of a sequence of data samples. The sample generator is configured to generate first sample data and second sample data based on the joint probability distribution. The first sample data and the second sample data are associated with at least one data sample of the sequence of data samples.

20 Claims, 18 Drawing Sheets

(56) References Cited

U.S. PATENT DOCUMENTS

| | | | | |
|---|---|---|---|---|
| 7,630,902 | B2 * | 12/2009 | You | G10L 19/025 704/229 |
| 8,209,190 | B2 * | 6/2012 | Ashley | G10L 19/24 704/201 |
| 2006/0206320 | A1 * | 9/2006 | Li | G10L 21/0208 704/226 |
| 2009/0232228 | A1 * | 9/2009 | Thyssen | G10L 19/005 375/242 |
| 2019/0236482 | A1 | 8/2019 | Desjardins et al. | |
| 2020/0358453 | A1 * | 11/2020 | Gómez Correa | H03M 3/042 |
| 2021/0074308 | A1 | 3/2021 | Skordilis et al. | |
| 2021/0201920 | A1 * | 7/2021 | Liu | G10L 19/028 |
| 2022/0044694 | A1 * | 2/2022 | Klejsa | G10L 25/30 |
| 2022/0078561 | A1 * | 3/2022 | Lai | G10L 21/02 |
| 2024/0428813 | A1 * | 12/2024 | Sautiere | G10L 19/12 |

OTHER PUBLICATIONS

International Search Report and Written Opinion—PCT/US2022/079945—ISA/EPO—Feb. 3, 2023.

Van Den Oord A., et al., "WaveNet: A Generative Model for Raw Audio", arXiv.org, Cornell University Library, 201 Olin Library Cornell University Ithaca, NY 14853, Sep. 12, 2016, pp. 1-15, XP080725972, Abstract, Figures 1-4, p. 1, 2, 5.

Vipperla et al., "Bunched LPCNet : Vocoder for Low-cost Neural Text-To-Speech Systems", Aug. 11, 2020, pp. 1-5.

Valin et al., "LPCNET: Improving Neural Speech Synthesis Through Linear Prediction", Feb. 19, 2019, pp. 1-5.

Simoncelli et al., "Subband Transforms", MIT Media Laboratory Vision and Modeling Technical Report #137. Appears in: "Subband Coding", edited by John Woods, Kluwer Academic Press, 1990, pp. 143-192.

* cited by examiner

SAMPLE GENERATION BASED ON JOINT PROBABILITY DISTRIBUTION

I. CROSS-REFERENCE TO RELATED APPLICATIONS

The present application claims the benefit of priority from the commonly owned Greece Provisional Patent Application No. 20220100011, filed Jan. 7, 2022, entitled "SAMPLE GENERATION BASED ON JOINT PROBABILITY DISTRIBUTION," which is incorporated by reference in its entirety.

Field

The present disclosure is generally related to generating sample data based on a joint probability distribution.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices may include the capability to generate sample data, such as reconstructed audio samples. For example, a device may receive encoded audio data that is decoded and processed to generate reconstructed audio samples. Some types of data (e.g., audio data) have local or across-sample dependencies. Sample generation that does not take account of such dependencies can have lower quality (e.g., resulting in reconstructed audio that is more jittery than original audio).

III. SUMMARY

According to one implementation of the present disclosure, a device includes a neural network and a sample generator. The neural network is configured to process one or more neural network inputs to generate a joint probability distribution. The one or more neural network inputs include at least first previous sample data and second previous sample data associated with at least one previous data sample of a sequence of data samples. The sample generator is configured to generate first sample data and second sample data based on the joint probability distribution. The first sample data and the second sample data are associated with at least one data sample of the sequence of data samples.

According to another implementation of the present disclosure, a method includes processing one or more neural network inputs using a neural network to generate a joint probability distribution. The one or more neural network inputs include at least first previous sample data and second previous sample data associated with at least one previous data sample of a sequence of data samples. The method also includes generating first sample data and second sample data based on the joint probability distribution. The first sample data and the second sample data are associated with at least one data sample of the sequence of data samples.

According to another implementation of the present disclosure, a non-transitory computer-readable medium includes instructions that, when executed by one or more processors, cause the one or more processors to process one or more neural network inputs using a neural network to generate a joint probability distribution. The one or more neural network inputs include at least first previous sample data and second previous sample data associated with at least one previous data sample of a sequence of data samples. The instructions, when executed by the one or more processors, also cause the one or more processors to generate first sample data and second sample data based on the joint probability distribution, the first sample data and the second sample data associated with at least one data sample of the sequence of data samples.

According to another implementation of the present disclosure, an apparatus includes means for processing one or more neural network inputs using a neural network to generate a joint probability distribution, the one or more neural network inputs including at least first previous sample data and second previous sample data associated with at least one previous data sample of a sequence of data samples. The apparatus also includes means for generating first sample data and second sample data based on the joint probability distribution, the first sample data and the second sample data associated with at least one data sample of the sequence of data samples.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
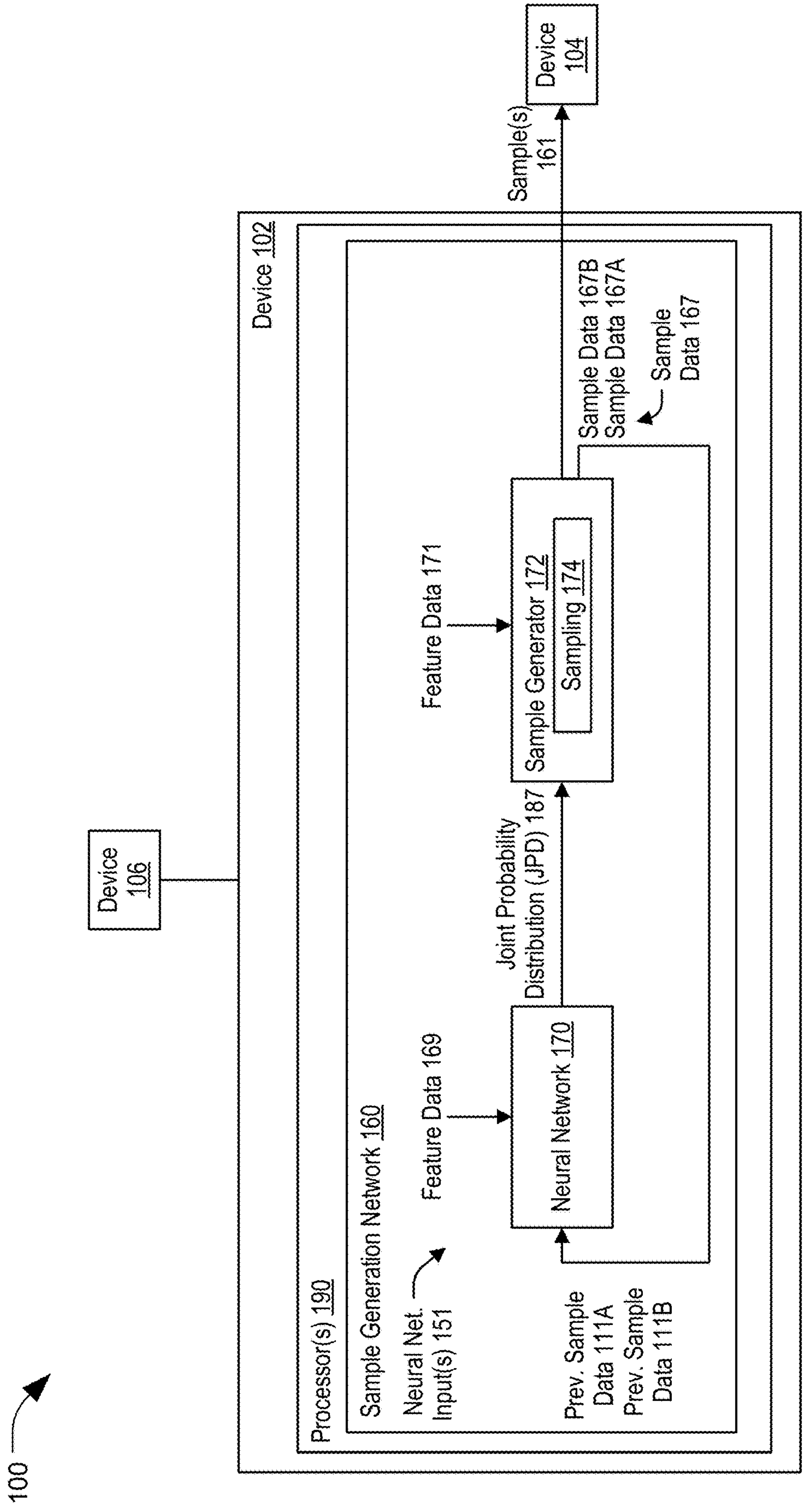
FIG. 1 is a block diagram of a particular illustrative aspect of a system operable to generate sample data based on joint probability distribution, in accordance with some examples of the present disclosure.

Some types of data (e.g., audio data) have local or across-sample dependencies. Sample generation that takes account of such dependencies can have improved results, such as smoother (e.g., less jittery) reconstructed data. Systems and methods of sample data generation based on joint probability distribution are disclosed. For example, a neural network is trained to generate a joint probability distribution based on neural network inputs that are based on multiple samples or multiple portions of the same sample from a time series of data. Each sample from the time series of data represents a time windowed portion of data, and samples are sequential and may partially overlap one another.

In some examples, the joint probability distribution represents estimated interdependencies between different samples in the time series. The joint probability distribution in such examples represents across-sample dependencies between two or more samples of the time series of data.

In some examples, the joint probability distribution represents estimated interdependencies between different portions of a single sample in the time series. Such interdependencies between different portions of a single sample are referred to herein as local dependencies. To illustrate, when the samples represent audio data, a single sample can represent multiple frequency sub-bands. In this illustrative example, the joint probability distribution for sub-band portions of a single sample represents across-sub-band dependencies between two or more sub-bands of the audio data.

In some examples, the joint probability distribution represents both local dependencies and dependencies between two or more samples.

After the joint probability distribution is generated (e.g., based on previously generated data samples or sample portions of a time series or based on a prior time series), the joint probability distribution can be used to generate sample data that accounts for estimated sample-to-sample or local dependencies. For example, when features for new data samples are received (e.g., next data samples to be generated of the time series or of a new time series), a sample generator is configured to generate residuals based on the joint probability distribution and to generate the new data samples based on the features and the residuals. To illustrate, the joint probability distribution indicates probabilities of various combinations of values of the residuals, and a particular combination of values is selected for the residuals based on the probabilities. In some examples, the new data samples are generated based on the features, and are modified based on the residuals. Generating the new data samples based on the residuals that are selected based on the joint probability distribution accounts for estimated dependencies (e.g., across-sample dependencies, local dependencies, or a combination thereof) of the new data samples. Residual data representing the residuals can be used in subsequent processing in place of or in addition to the new data samples. To illustrate, a joint probability distribution can be generated based on the residuals, the new data samples, or both, to generate a next set of data samples of the time-series. Taking account of dependencies in the sample generation can result in generation of improved sample data (e.g., smoother or less jittery reconstructed audio).

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple sets of sample data are illustrated and associated with reference numbers 167A and 167B. When referring to a particular one of these sets of sample data, such as sample data 167A, the distinguishing letter "A" is used. However, when referring to any arbitrary one of these sets of sample data or to these sets of sample data as a group, the reference number 167 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 configured to generate sample data based on joint probability distribution is shown. The device 102 includes one or more processors 190. A sample generation network 160 of the one or more processors 190 includes a neural network 170 coupled to a sample generator 172. In a particular aspect, the device 102 is coupled to a device 104, a device 106, or both. In some examples, the device 104, the device 106, or both, include a display device, a storage device, a network device, a user device, a communication device, a computing device, or a combination thereof.

The neural network 170 is configured to generate a joint probability distribution (JPD) 187 based on one or more neural network inputs 151. In some implementations, the neural network 170 includes an autoregressive (AR) generative neural network. For example, the neural network 170 is configured to use previous output (e.g., previous sample data 111) of the sample generator 172 as part of the one or more neural network inputs 151 to generate the joint probability distribution 187 that is used by the sample generator 172 to generate subsequent output (e.g., sample data 167). In some aspects, the neural network 170 includes a convolutional neural network (CNN), WaveNet, PixelCNN, a transformer network with an encoder and a decoder, Bidirectional Encoder Representations from Transformers (Bert), another type of AR generative neural network, or a combination thereof.

The sample generator 172 is configured to generate sample data 167 based at least in part on the joint probability distribution 187. In an example, the sample generator 172 is configured to perform sampling 174 based on the joint probability distribution 187 to determine residuals that are used in conjunction with linear prediction filtering to generate the sample data 167. The sample generator 172 generates one or more samples 161 based on the sample data 167. In some implementations, the sample data 167A represents a first sample 161 and the sample data 167A represents a second sample 161. In other implementations, the sample data 167A and the sample data 167B represent sample portions, and the sample generator 172 generates a sample 161 based at least in part on the sample data 167A and the sample data 167B.

Examples of the one or more samples 161 corresponding to audio data are described with reference to FIGS. 2-5. In other examples, the one or more samples 161 can correspond to other types of data, such as image data, video data, or various other types of data.

In some implementations, the sample generation network 160 is configured to generate the one or more samples 161 based on feature data (e.g., feature data 169, feature data 171, or both) indicating one or more features, such as audio features, image features, video features, or various other types of data features. For example, audio features can include linear predictive coding (LPC) coefficients, pitch estimation, pitch gain, pitch lag, pitch correlation, Bark-frequency cepstrum, other audio features, or a combination thereof. Image features can include pixel values, other image features, or a combination thereof. Video features can include key frame information, predicted frame information, other video features, or a combination thereof. In a particular aspect, the neural network 170 is configured to generate the joint probability distribution 187 based at least in part on the feature data 169, the sample generator 172 is configured to generate the sample data 167 based at least in part on the feature data 171, or both. In some aspects, the feature data 169 is the same as the feature data 171. In other aspects, the feature data 169 is distinct from the feature data 171.

In some implementations, the device 106 generates encoded data representing features of data samples and sends the encoded data to the device 102. The device 102 generates the feature data 169, the feature data 171, or both, based on decoding the encoded data. The one or more samples 161 correspond to a reconstruction (e.g., estimation) of the data samples of the device 106. In some implementations, a component of the device 102 (e.g., an audio generator, an image generator, a video generator, or a combination thereof) generates the feature data 169, the feature data 171, or both.

In some implementations, the device 102 corresponds to or is included in one of various types of devices. In an illustrative example, the one or more processors 190 are integrated in a headset device, such as described further with reference to FIG. 12. In other examples, the one or more processors 190 are integrated in at least one of a mobile phone or a tablet computer device, as described with reference to FIG. 11, a wearable electronic device, as described with reference to FIG. 13, a voice-controlled speaker system, as described with reference to FIG. 14, a camera device, as described with reference to FIG. 15, or a virtual reality, mixed reality, or augmented reality headset, as described with reference to FIG. 16. In another illustrative example, the one or more processors 190 are integrated into a vehicle, such as described further with reference to FIG. 17 and FIG. 18.

During operation, the neural network 170 processes one or more neural network inputs 151 to generate a joint probability distribution 187, as further described with reference to FIGS. 4A-4B. In some examples, the one or more neural network inputs 151 include at least previous sample data 111A and previous sample data 111B. In some examples, the one or more neural network inputs 151 include the feature data 169. The neural network 170 generates a neural network embedding based on the one or more neural network inputs 151. The neural network embedding is processed by one or more layers of nodes of the neural network 170 to generate the joint probability distribution 187.

The sample generator 172 generates at least sample data 167A and sample data 167B based on the joint probability distribution 187, the feature data 171, or both, as further described with reference to FIG. 4A-6B. For example, the sample generator 172 performs sampling 174 based on the joint probability distribution 187 and generates the sample data 167A and the sample data 167B based on the sampling 174.

In a particular implementation, the joint probability distribution 187 indicates probabilities of various combinations of values of first residual data and second residual data, and the sample generator 172 performs the sampling 174 to select a particular combination of values of the first residual data and the second residual data based on the probabilities indicated by the joint probability distribution 187, as further described with reference to FIGS. 4A-5. The sample generator 172 generates the sample data 167A based at least in part on the first residual data, and generates the sample data 167B based at least in part on the second residual data, as further described with reference to FIGS. 6A-6B.

In some implementations, the sample generator 172 generates the sample data 167A based at least in part on the first residual data, the feature data 171, or both, and generates the sample data 167B based at least in part on the feature data 171, the second residual data, or both. In an illustrative example, the sample data 167A represents a sample (or a sample portion) that is generated based on the feature data 171 and modified based on the first residual data. The sample generator 172 provides at least the sample (or the sample portion), the first residual data, or both, as part of the previous sample data 111A to the neural network 170 for a subsequent iteration.

In some implementations, each of the sample data 167 represents a different data sample of the samples 161 (e.g., a sequence of data samples). For example, the previous sample data 111A represents a first sample 161 and the previous sample data 111B represents a second sample 161, where the second sample 161 is subsequent to the first sample 161 in the sequence of data samples. The sample data 167A and the sample data 167B are generated based on the joint probability distribution 187 that represents estimated (e.g., predicted) inter-sample dependencies between the sample data 167A and the sample data 167B. In some aspects, the estimated inter-sample dependencies are conditioned on previous samples (e.g., the first sample 161 and the second sample 161) and features (e.g., indicated by the feature data 169). The sample data 167A represents a third sample 161 that is subsequent to the second sample 161 in the sequence of data samples, and the sample data 167B represents a fourth sample 161 that is subsequent to the third sample 161 in the sequence of data samples.

In some implementations, a plurality of the sample data 167 represents different sample portions of the same sample 161 of the sequence of data samples. For example, the sample generator 172 may generate a sample 161 by combining a first sample portion represented by the sample data 167A and a second sample portion represented by the sample data 167B, such as described further with reference to FIG. 5. Although two sample portions may be combined to generate a sample 161, in other examples more than two sample portions may be combined to form a single sample 161.

In an illustrative example, the previous sample data 111A represents a first sample portion of a sample 161, and the previous sample data 111B represents a second sample portion of the sample 161. The sample data 167A and the sample data 167B are generated based on the joint probability distribution 187 that represents estimated local dependencies between the sample data 167A and the sample data 167B. In a particular aspect, the joint probability distribution 187 is conditioned at least in part on dependencies between the first sample portion and the second sample portion of the sample 161.

In a particular aspect, the sample data 167A represents a third sample portion of the sample 161, and the sample data 167B represents a fourth sample portion of the sample 161. The sample generation network 160 generates the sample 161 based on the sample data representing the sample portions of the sample 161. The sample data 167A and the sample data 167B corresponding to sample portions of the same sample 161 as the sample portions represented by the previous sample data 111A and the previous sample data 111B is provided as an illustrative example. In other examples, the previous sample data 111A and the previous sample data 111B can correspond to sample portions of a first sample 161, and the sample data 167A and the sample data 167B can correspond to sample portions of a second sample 161. In a particular aspect, the sample generator 172 provides the one or more samples 161 to the device 104.

The one or more neural network inputs 151 including two sets of previous sample data (e.g., the previous sample data 111A and the previous sample data 111B) and the sample generator 172 generating two sets of sample data (e.g., the sample data 167A and the sample data 167B) at each iteration is provided as an illustrative example. In other examples, the one or more neural network inputs 151 can include more than two sets of previous sample data, the sample generator 172 can generate more than two sets of sample data, or both.

In some examples, the one or more neural network inputs 151 include the same count of sets of previous sample data as a count of sets of sample data generated by the sample generator 172 in each iteration. In other examples, the one or more neural network inputs 151 include fewer sets of previous sample data than a count of sets of sample data generated by the sample generator 172 in each iteration. For example, the one or more neural network inputs 151 can include a subset of the previous sample data generated by the sample generator 172 in the previous iteration.

By having the neural network 170 generate the joint probability distribution 187 based at least in part on the previous sample data 111A and the previous sample data 111B, and having the sample generator 172 generate the sample data 167A and the sample data 167B based on the joint probability distribution 187, the system 100 enables generation of the sample data 167 that takes account of estimated dependencies between the sets of the sample data 167. The resulting sequence of data samples represented by the sample data 167 can be smoother (e.g., have less discontinuity or jitters) as compared to a sequence of data samples that is generated without taking account of such dependencies.

Figure 2:
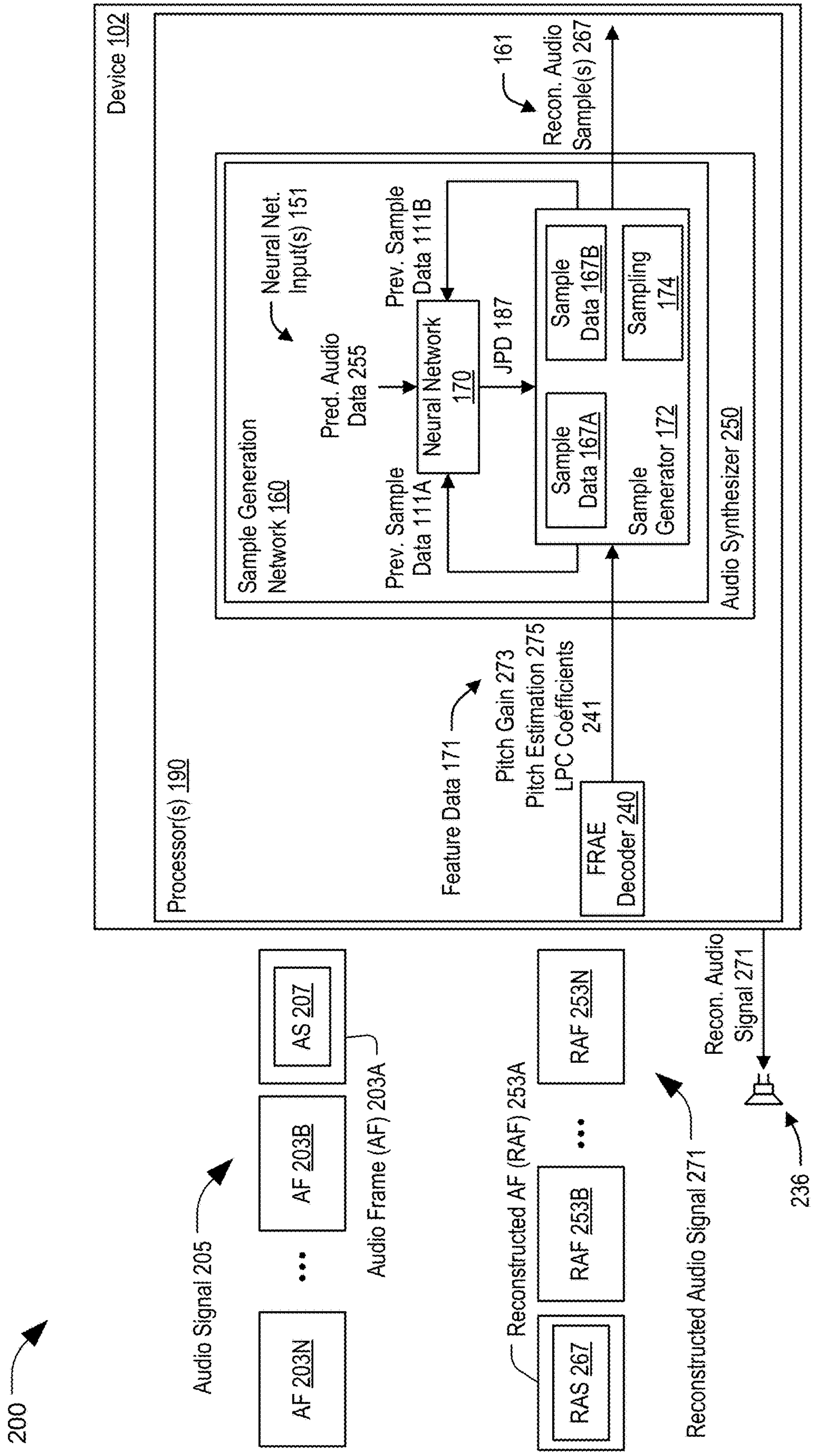
FIG. 2 is a diagram of an illustrative aspect of a system operable to generate a reconstructed audio sample based on joint probability distribution, in accordance with some examples of the present disclosure.

Referring to FIG. 2, a diagram of an illustrative aspect of a system 200 operable to generate a reconstructed audio sample based on joint probability distribution is shown. In some aspects, the system 100 of FIG. 1 includes one or more components of the system 200.

The system 200 corresponds to an audio coding system. For example, the one or more processors 190 include an audio decoder (e.g., a feedback recurrent autoencoder (FRAE) decoder 240) that is coupled to an audio synthesizer 250. The one or more processors 190 are coupled to one or more speakers 236. In some implementations, the one or more speakers 236 are external to the device 102. In other implementations, the one or more speakers 236 are integrated in the device 102.

The FRAE decoder 240 is configured to generate feature data 171. For example, the feature data 171 includes LPC coefficients 241, a pitch gain 273, a pitch estimation 275, or a combination thereof. The audio synthesizer 250 includes the sample generation network 160 that is configured to generate the sample data 167A and the sample data 167B based on the joint probability distribution 187, the feature data 171, or a combination thereof, as further described with reference to FIGS. 4A-6B. The sample generator 172 is configured to generate at least one reconstructed audio sample 267 of a reconstructed audio signal 271 based on the sample data 167A and the sample data 167B. In a particular aspect, one or more reconstructed audio samples 267 correspond to the one or more samples 161.

In some implementations, an audio signal 205 is captured by one or more microphones, converted from an analog signal to a digital signal by an analog-to-digital converter, and compressed by an encoder for storage or transmission. In these implementations, the FRAE decoder 240 performs an inverse of a coding algorithm used by the encoder to decode the compressed signal to generate the feature data 171. In other implementations, the audio signal 205 (e.g., a compressed digital signal) is generated by an audio application of the one or more processors 190, and the FRAE decoder 240 decodes the compressed digital signal to generate the feature data 171. The audio signal 205 can include a speech signal, a music signal, another type of audio signal, or a combination thereof.

The FRAE decoder 240 is provided as an illustrative example of an audio decoder. In some examples, the one or more processors 190 can include any type of audio decoder that generates the feature data 171, using a suitable audio coding algorithm, such as a linear prediction coding algorithm (e.g., Code-Excited Linear Prediction (CELP), algebraic CELP (ACELP), or other linear prediction technique), or another audio coding algorithm.

The audio signal 205 can be divided into blocks of samples, where each block is referred to as a frame. For example, the audio signal 205 includes a sequence of audio frames 203, such as an audio frame (AF) 203A, an audio frame 203B, an audio frame 203N, one or more additional audio frames, or a combination thereof. In some examples, each of the audio frames 203 represents audio corresponding to 10-20 milliseconds (ms) of playback time, and each of the audio frames 203 includes about 160 audio samples.

In some examples, the reconstructed audio signal 271 corresponds to a reconstruction of the audio signal 205. For example, a reconstructed audio frame (RAF) 253A includes a representative reconstructed audio sample (RAS) 267 that corresponds to a reconstruction (e.g., an estimation) of a representative audio sample (AS) 207 of the audio frame 203A. The audio synthesizer 250 is configured to generate the reconstructed audio frame 253A based on the reconstructed audio sample 267, one or more additional reconstructed audio samples, or a combination thereof (e.g., about 160 reconstructed audio samples including the reconstructed audio sample 267). The reconstructed audio signal 271 includes the reconstructed audio frame 253A as a reconstruction or estimation of the audio frame 203A.

During operation, the FRAE decoder 240 generates the feature data 171 representing the audio frame 203A. In some implementations, the FRAE decoder 240 generates at least a portion of the feature data 171 (e.g., one or more of the LPC coefficients 241, the pitch gain 273, or the pitch estimation 275) by decoding corresponding encoded versions of the portion of the feature data 171 (e.g., the LPC coefficients 241, the pitch gain 273, or the pitch estimation 275). In some implementations, at least a portion of the feature data 171 (e.g., one or more of the LPC coefficients 241, the pitch gain 273, or the pitch estimation 275) is estimated independently of corresponding encoded versions of the portion of the feature data 171 (e.g., the LPC coefficients 241, the pitch gain 273, or the pitch estimation 275). To illustrate, a component (e.g., the FRAE decoder 240, a digital signal processor (DSP) block, or another component) of the one or more processors 190 can estimate a portion of the feature data 171 based on an encoded version of another portion of the feature data 171. For example, the pitch estimation 275 can be estimated based on a speech cepstrum. As another example, the LPC coefficients 241 can be estimated by processing various audio features, such as pitch lag, pitch correlation, the pitch gain 273, the pitch estimation 275, Bark-frequency cepstrum of a speech signal, or a combination thereof, of the audio frame 203A. In a particular aspect, the FRAE decoder 240 provides the decoded portions of the feature data 171 to the sample generator 172. In a particular aspect, the component (e.g., the FRAE decoder 240, the DSP block, or another component) of the one or more processors 190 provides the estimated portions of the feature data 171 to the sample generator 172.

The one or more neural network inputs 151 include previous sample data 111A (e.g., previous audio sample data or previous audio sample portion data), previous sample data 111B (e.g., previous audio sample data or previous audio sample portion data), predicted audio data 255, or a combination thereof, generated by the sample generator 172 during one or more previous iterations (e.g., one or more previous timesteps), as further described with reference to FIG. 4A-6B. The predicted audio data 255 includes long-term linear prediction (LTP) data, short-term linear prediction (LP) data, or both, as further described with reference to FIGS. 4A-6B.

The neural network 170 generates the joint probability distribution 187 based on the one or more neural network inputs 151, as further described with reference to FIGS. 4A-5. For example, the neural network 170 generates the joint probability distribution 187 based on the previous sample data 111A, the previous sample data 111B, the predicted audio data 255, or a combination thereof. The neural network 170 provides the joint probability distribution 187 to the sample generator 172.

The sample generator 172 performs the sampling 174 based on the joint probability distribution 187 to generate residual data, as further described with reference to FIGS. 4A-5. The sample generator 172 generates the sample data 167A and the sample data 167B based on the LPC coefficients 241, the residual data, the pitch gain 273, the pitch estimation 275, or a combination thereof, as further described with reference to FIGS. 4A-5. The sample generator 172 provides, to the neural network 170, the sample data 167A and the sample data 167B as the previous sample data 111A and the previous sample data 111B, respectively, for a subsequent iteration. In a particular aspect, the sample generator 172 generates predicted audio data (e.g., long-term linear prediction data, short-term linear prediction data, or both) during generation of the sample data 167A, the sample data 167B, or both. The sample generator 172 provides, to the neural network 170, the predicted audio data as at least part of the predicted audio data 255 for the subsequent iteration. In some implementations, the predicted audio data 255 for the subsequent iteration also includes predicted audio data generated during one or more previous iterations.

The sample generator 172 generates at least one reconstructed audio sample 267 of the reconstructed audio signal 271 based on the sample data 167A, the sample data 167B, or both, as further described with reference to FIGS. 4A-6B. The sample generation network 160 generates the reconstructed audio frame 253A based on the at least one reconstructed audio sample 267, one or more additional audio samples, or a combination thereof. Similarly, the sample generation network 160 generates a reconstructed audio frame 253B corresponding to a reconstruction or estimation of the audio frame 203B, a reconstructed audio frame 253N corresponding to a reconstruction or estimation of the audio frame 203N, one or more additional reconstructed audio frames, or a combination thereof. In some aspects, the audio synthesizer 250 outputs the reconstructed audio signal 271 via the one or more speakers 236. In some aspects, the reconstructed audio signal 271 includes a reconstructed speech signal, a reconstructed music signal, a reconstructed animal sound signal, a reconstructed noise signal, or a combination thereof.

Figure 3:
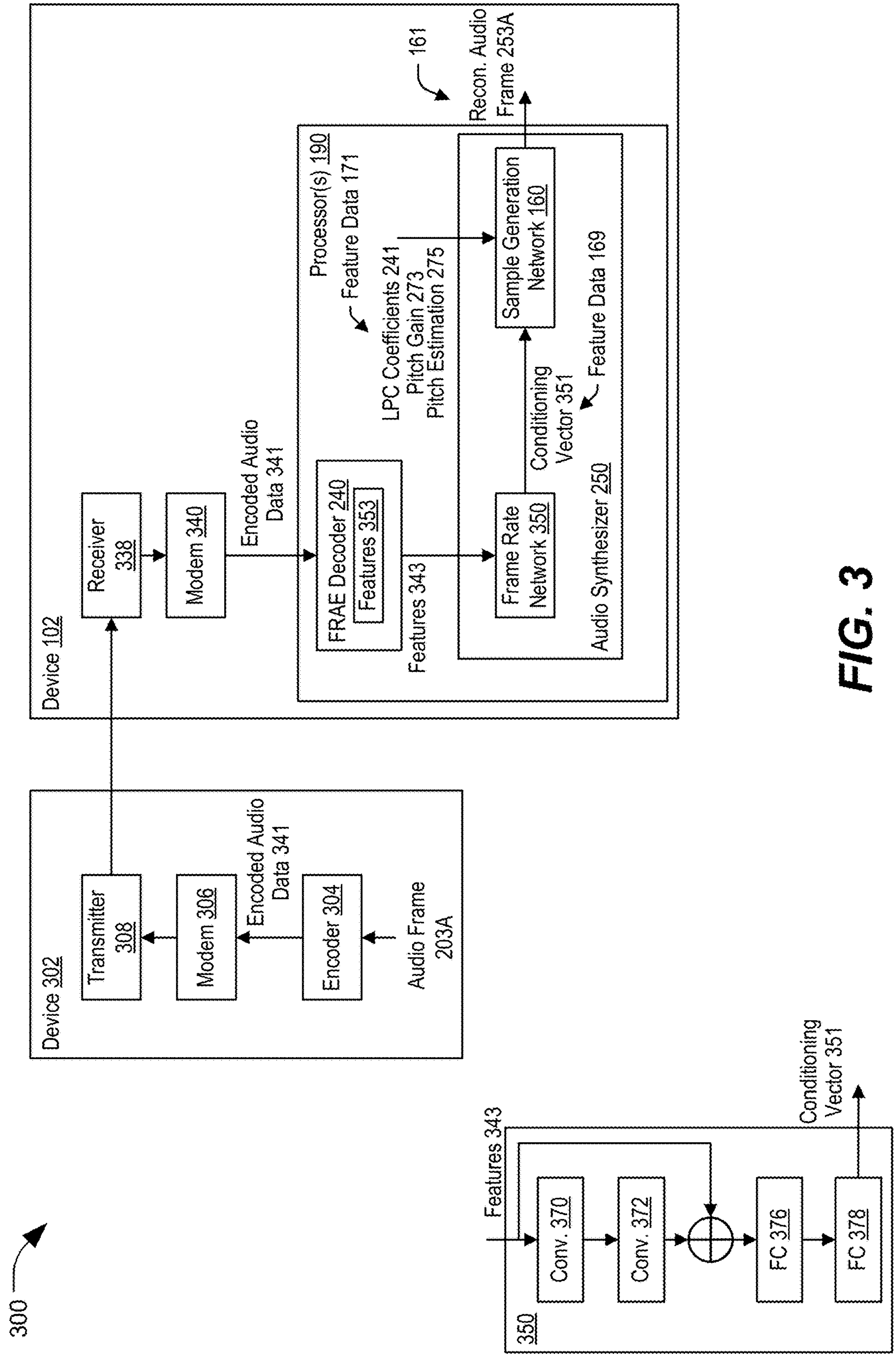
FIG. 3 is a diagram of an illustrative aspect of a system operable to generate a reconstructed audio sample based on joint probability distribution, in accordance with some examples of the present disclosure.

Referring to FIG. 3, a diagram of an illustrative aspect of a system 300 operable to generate a reconstructed audio sample based on joint probability distribution is shown. In some aspects, the system 100 includes one or more components of the system 300.

The system 300 includes a device 302 configured to communicate with the device 102. The device 302 includes an encoder 304 coupled via a modem 306 to a transmitter 308. The device 102 includes a receiver 338 coupled via a modem 340 to the FRAE decoder 240. The audio synthesizer 250 includes a frame rate network 350 coupled to the sample generation network 160. The FRAE decoder 240 is coupled to the frame rate network 350.

In some aspects, the encoder 304 of the device 302 uses an audio coding algorithm to process the audio signal 205 of FIG. 2. For example, the audio signal 205 can include a digitized audio signal. In some implementations, the digitized audio signal is generated using a filter to eliminate aliasing, a sampler to convert to discrete-time, and an analog-to-digital converter for converting an analog signal to the digital domain. The resulting digitized audio signal is a discrete-time audio signal with samples that are also discretized. Using the audio coding algorithm, the encoder 304 can generate a compressed audio signal that represents the audio signal 205 using as few bits as possible, while attempting to maintain a certain quality level for audio. The audio coding algorithm can include a linear prediction coding algorithm (e.g., CELP, ACELP, or other linear prediction technique) or other voice coding algorithm.

As an example, the encoder 304 uses an audio coding algorithm to encode the audio frame 203A of the audio signal 205 to generate encoded audio data 341 of the compressed audio signal. The modem 306 initiates transmission of the compressed audio signal (e.g., the encoded audio data 341) via the transmitter 308. The modem 340 of the device 102 receives the compressed audio signal (e.g., the encoded audio data 341) via the receiver 338, and provides the compressed audio signal (e.g., the encoded audio data 341) to the FRAE decoder 240.

The FRAE decoder 240 decodes the compressed audio signal to extract features representing the audio signal 205 and provides the features to the audio synthesizer 250 to generate the reconstructed audio signal 271. For example, the FRAE decoder 240 decodes the encoded audio data 341 to generate features 353 representing the audio frame 203A.

The features 353 can include any set of features of the audio frame 203A generated by the encoder 304. In some implementations, the features 353 can include quantized features. In other implementations, the features 353 can include dequantized features. In a particular aspect, the features 353 includes the LPC coefficients 241, the pitch gain 273, the pitch estimation 275, pitch lag with fractional accuracy, the Bark cepstrum of a speech signal, the 18-band Bark-frequency cepstrum, an integer pitch period (or lag) (e.g., between 16 and 256 samples), a fractional pitch period (or lag), a pitch correlation (e.g., between 0 and 1), or a combination thereof. In some implementations, the features 353 can include features for one or more (e.g., two) audio frames preceding the audio frame 203A in the sequence of audio frames 203, the audio frame 203A, one or more (e.g., two) audio frames subsequent to the audio frame 203A in the sequence of audio frames 203, or a combination thereof.

In a particular aspect, the features 353 explicitly include at least a portion of the feature data 171 (e.g., the LPC coefficients 241, the pitch gain 273, the pitch estimation 275, or a combination thereof), and the FRAE decoder 240 provides at least the portion of the feature data 171 (e.g., the LPC coefficients 241, the pitch gain 273, the pitch estimation 275, or a combination thereof) to the sample generation network 160.

In a particular aspect, the features 353 extracted from the encoded audio data 341 do not explicitly include a particular feature (e.g., the LPC coefficients 241, the pitch gain 273, the pitch estimation 275, or a combination thereof), and the particular feature is estimated based on other features explicitly included in the features 353. For example, the FRAE decoder 240 provides one or more features explicitly included in the features 353 to another component (e.g., a DSP block) of the one or more processors 190 to generate the particular feature, and the other component provides the particular feature to the sample generation network 160. For example, in implementations in which the features 353 do not explicitly include the LPC coefficients 241 and include a Bark cepstrum, the LPC coefficients 241 can be estimated based on the Bark cepstrum. To illustrate, the LPC coefficients 241 are estimated by converting an 18-band Bark-frequency cepstrum into a linear-frequency spectral density (PSD), using an inverse Fast Fourier Transform (iFFT) to convert the PSD to an auto-correlation, and using the Levinson-Durbin algorithm on the auto-correlation to determine the LPC coefficients 241. As another example, in implementations in which the features 353 do not explicitly include the pitch estimation 275 and include a speech cepstrum of the audio frame 203A, the pitch estimation 275 can be estimated based on the speech cepstrum.

In some aspects, the FRAE decoder 240 provides one or more features 343 of the features 353 to the frame rate network 350 to generate a conditioning vector 351. In a particular implementation, the frame rate network 350 includes a convolutional (conv.) layer 370, a convolutional layer 372, a fully connected (FC) layer 376, and a fully connected layer 378. The convolutional layer 370 processes the features 343 to generate an output that is provided to the convolutional layer 372. In some cases, the convolutional layer 370 and the convolutional layer 372 include filters of the same size. For example, the convolutional layer 370 and the convolutional layer 372 can include a filter size of 3, resulting in a receptive field of five audio frames (e.g., features of two preceding audio frames, the audio frame 203A, and two subsequent audio frames). The output of the convolutional layer 372 is added to the features 343 and is then processed by the fully connected layer 376 to generate an output that is provided as input to the fully connected layer 378. The fully connected layer 378 processes the input to generate the conditioning vector 351. The feature data 169 includes the conditioning vector 351.

The frame rate network 350 provides the feature data 169 (e.g., the conditioning vector 351) to the sample generation network 160. In one illustrative example, the conditioning vector 351 is a 128-dimensional vector. In some aspects, the feature data 169 (e.g., the conditioning vector 351), the feature data 171 (e.g., the LPC coefficients 241, the pitch gain 273, the pitch estimation 275, or a combination thereof), or both, can be held constant for the duration of processing each audio frame. The sample generation network 160 generates the reconstructed audio frame 253A based on the feature data 169, the feature data 171, or a combination thereof, as further described with reference to FIGS. 4A-5. In a particular aspect, the reconstructed audio frame 253A includes at least some of the one or more samples 161.

In some implementations, each of the FRAE decoder 240 and the frame rate network 350 is configured to process data at a frame rate (e.g., once per 10 ms audio frame). In implementations in which the sample generation network 160 generates subband audio samples (e.g., sample portions) of a single reconstructed audio sample 267 in each iteration, as described with reference to FIG. 5, the sample generation network 160 processes data at a multi sample portion rate (e.g., count of reconstructed audio sample portions generated in an iteration). For example, in implementations in which the sample generation network 160 generates two subband audio samples of a single reconstructed audio sample 267 in each iteration, the sample generation network 160 processes data at the rate of two subband audio samples per iteration. In some implementations in which the sample generation network 160 generates two subband audio samples used to generate multiple reconstructed audio samples in each iteration, as further described with reference to FIG. 5, the sample generation network 160 processes data at the rate of the count of the reconstructed audio samples generated. In an implementation in which the sample generation network 160 generates a group of jointly-modeled audio samples in each iteration, the sample generation network 160 processes data at the rate of a count of samples in the group per iteration. In implementations in which the sample generation network 160 generates multiple reconstructed audio samples 267 (e.g., two audio samples) in each iteration, as described with reference to FIGS. 4A-4B, the sample generation network 160 processes data at a multi-sample rate (e.g., two audio samples per iteration).

Figure 4A:
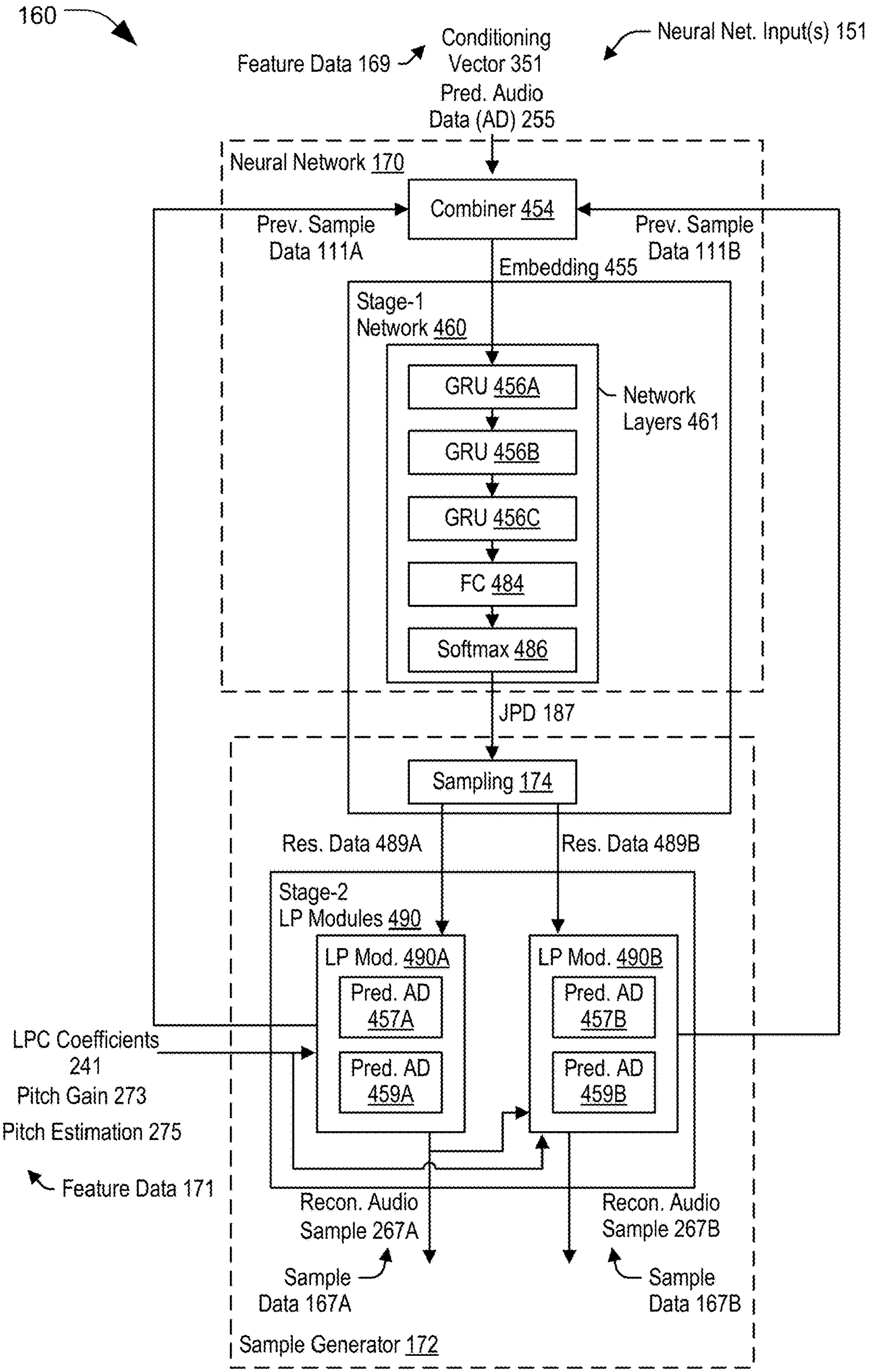
FIG. 4A is a diagram of an illustrative implementation of a sample generation network of any of the systems of FIGS. 1-3, in accordance with some examples of the present disclosure.
Figure 4B:
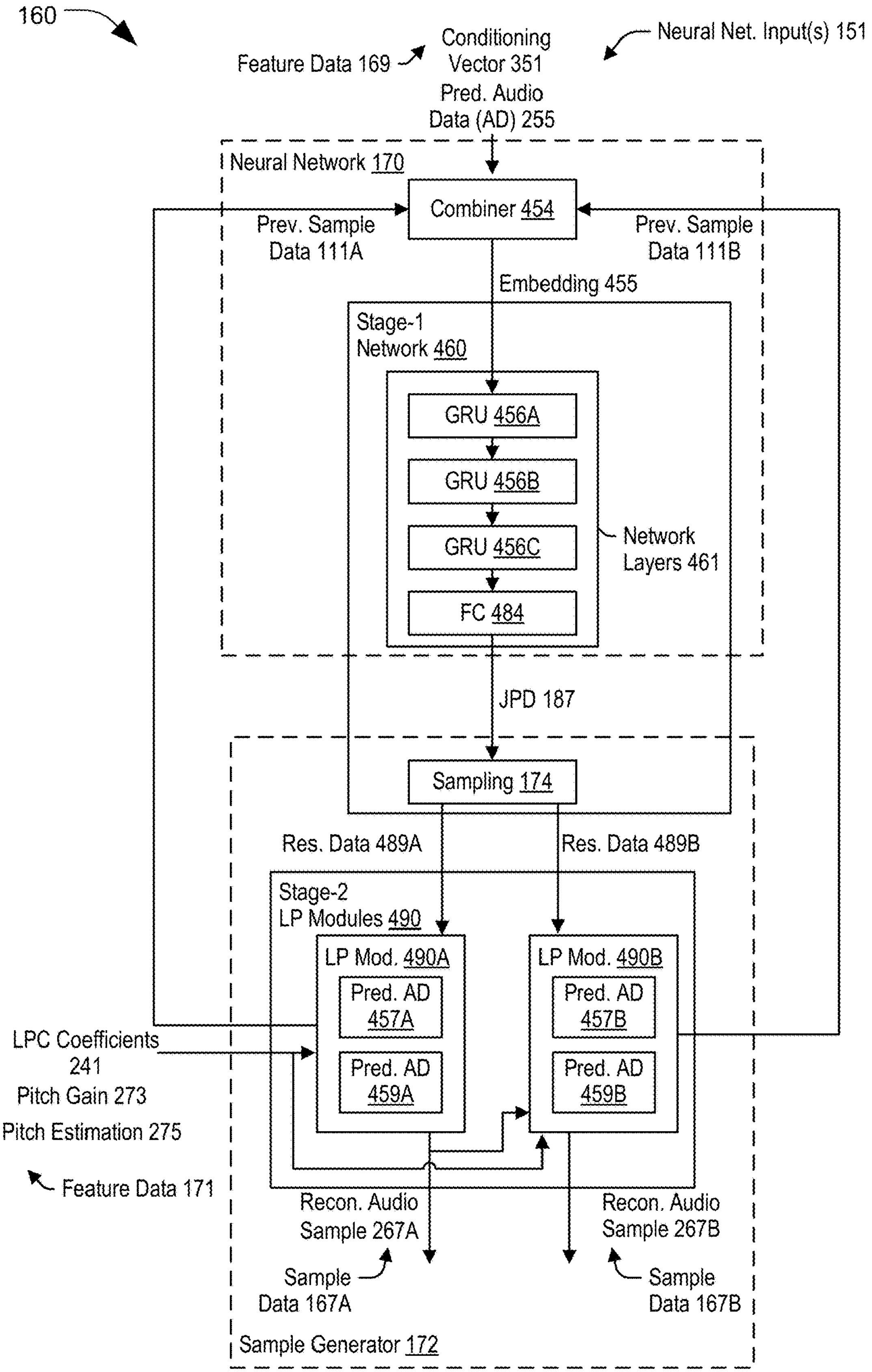
FIG. 4B is a diagram of another illustrative implementation of a sample generation network of any of the systems of FIGS. 1-3, in accordance with some examples of the present disclosure.

In FIGS. 4A and 4B, examples of illustrative implementations of the sample generation network 160 are shown. In FIG. 4A, the joint probability distribution 187 generated by the neural network 170 represents a probability distribution of discrete (e.g., quantized) values of residual data. In FIG. 4B, the joint probability distribution 187 generated by the neural network 170 represents a continuous probability distribution of real-values of residual data.

Referring to FIG. 4A, a diagram of an illustrative implementation of the sample generation network 160 is shown. The sample generation network 160 includes a combiner 454 coupled via a network 460 to a plurality of LP modules 490.

In some aspects, the network 460 corresponds to a first stage during which multiple sets of previous sample data 111 are processed using a combined network, and the plurality of LP modules 490 correspond to a second stage during which each set of residual data is processed separately using a LP module 490 to generate a corresponding set of sample data 167.

The network 460 is configured to generate residual data 489A (e.g., a first excitation) and residual data 489B (e.g., a second excitation) based on the joint probability distribution 187. The network 460 includes network layers 461, such as a plurality of recurrent layers, a feed forward layer, a softmax layer 486, or a combination thereof. A recurrent layer includes a gated recurrent unit (GRU), such as a GRU 456. In a particular aspect, the plurality of recurrent layers includes a first recurrent layer including a GRU 456A, a second recurrent layer including a GRU 456B, and a third recurrent layer including a GRU 456C. The feed forward layer includes a fully connected (FC) layer, such as a FC layer 484.

The combiner 454 is coupled to the first recurrent layer (e.g., the GRU 456A) of the plurality of recurrent layers, the GRU 456 of each previous recurrent layer is coupled to the GRU 456 of a subsequent recurrent layer, and the GRU 456 of a last recurrent layer (e.g., the third recurrent layer) is coupled to the FC layer 484. The FC layer 484 is coupled to the softmax layer 486. The network 460 including three recurrent layers is provided as an illustrative example. In other examples, the network 460 can include fewer than three or more than three recurrent layers. In some implementations, the network 460 may include one or more additional layers, one or more additional connections, or a combination thereof, that are not shown for ease of illustration.

The combiner 454 is configured to process the one or more neural network inputs 151 to generate an embedding 455. The one or more neural network inputs 151 includes the feature data 169 (e.g., the conditioning vector 351), the previous sample data 111A, the previous sample data 111B, the predicted audio data 255, or a combination thereof. In a particular aspect, the previous sample data 111A includes at least sample data generated by a LP module 490A during a previous iteration. In a particular aspect, the previous sample data 111B includes at least sample data generated by a LP module 490B during the previous iteration. In a particular aspect, the predicted audio data 255 includes predicted audio data generated by the LP module 490A during one or more previous iterations, predicted audio data generated by the LP module 490B during one or more previous iterations, or both. In some aspects, the LP module 490 generates the previous sample data 111 based on synthesized residual data and generates predicted audio data 457 by applying long-term linear prediction to the synthesized residual data based on the pitch gain 273, the pitch estimation 275, or both, as further described with reference to FIGS. 6A-6B. In some aspects, the LP module 490 generates predicted audio data 459 by applying short-term linear prediction to the previous sample data 111 based on the LPC coefficients 241, as further described with reference to FIGS. 6A-6B. The predicted audio data 255 includes the predicted audio data 457, the predicted audio data 459, or both.

The plurality of recurrent layers is configured to process the embedding 455. In some implementations, the GRU 456A determines a first hidden state based on a previous first hidden state and the embedding 455. The previous first hidden state is generated by the GRU 456A during the previous iteration. The GRU 456A outputs the first hidden state to the GRU 456B. The GRU 456B determines a second hidden state based on the first hidden state and a previous second hidden state. The previous second hidden state is generated by the GRU 456B during the previous iteration. Each previous GRU 456 outputs a hidden state to a subsequent GRU 456 of the plurality of recurrent layers and the subsequent GRU 456 generates a hidden state based on the received hidden state and a previous hidden state. The GRU 456 of the last recurrent layer (e.g., the GRU 456C) outputs the hidden state to the FC layer 484.

The FC layer 484 is configured to process an output of the plurality of recurrent layers. For example, the FC layer 484 includes a dual FC layer. Outputs of two fully-connected layers of the FC layer 484 are combined with an element-wise weighted sum to generate an output. The output of the FC layer 484 is provided to the softmax layer 486 to generate the joint probability distribution 187. In a particular aspect, the joint probability distribution 187 indicates probabilities of various combinations of values of residual data 489A and residual data 489B.

In some examples, the one or more neural network inputs 151 can be mu-law encoded and embedded using a network embedding layer of the combiner 454 to generate the embedding 455. For instance, the embedding 455 can map (e.g., in an embedding matrix) each mu-law level to a vector, essentially learning a set of non-linear functions to be applied to the mu-law value. The embedding matrix (e.g., the embedding 455) can be sent to one or more of the plurality of recurrent layers (e.g., the GRU 456A, the GRU 456B, the GRU 456C, or a combination thereof). For example, the embedding matrix (e.g., the embedding 455) can be input to the GRU 456A, the output of the GRU 456A can be input to the GRU 456B, and the output of the GRU 456B can be input to the GRU 456C. In another example, the embedding matrix (e.g., the embedding 455) can be separately input to the GRU 456A, to the GRU 456B, to the GRU 456C, or a combination thereof.

In some aspects, the product of an embedding matrix that is input to a GRU 456 with a corresponding submatrix of the non-recurrent weights of the GRU 456 can be computed. A transformation can be applied for all gates (e.g., update gate (u), reset gate (r), and hidden state (h)) of the GRU 456 and all of the embedded inputs (e.g., the one or more neural network inputs 151). In some cases, one or more of the one or more neural network inputs 151 may not be embedded, such as the conditioning vector 351. Using the previous sample data 111A as an example of an embedded input, E can denote the embedding matrix and $U^{(u,s)}$ can denote a submatrix of $U^{(n)}$ including the columns that apply to the embedding of the previous sample data 111A, and a new embedding matrix $V^{(u,s)}=U^{(u,s)}E$ can be derived that directly maps the previous sample data 111A to the non-recurrent term of the update gate computation.

The output from the GRU 456C, or outputs from the GRU 456A, the GRU 456B, and the GRU 456C when the embedding matrix (e.g., the embedding 455) is input separately to the GRU 456A, to the GRU 456B, and to the GRU 456C, is provided to the FC layer 484. In some examples, the FC layer 484 can include two fully-connected layers combined with an element-wise weighted sum. Using the combined fully connected layers can enable computing the joint probability distribution 187 without significantly increasing the size of the preceding layer. In one illustrative example, the FC layer 484 can be defined as $\text{dual\_fc}(x)=a_1\cdot\tanh(W_1x)+a_2\cdot\tanh(W_2x)$, where $W_1$ and $W_2$ are weight matrices, $a_1$ and $a_2$ are weighting vectors, and tanh is the hyperbolic tangent function that generates a value between −1 and 1.

In some implementations, the output of the FC layer 484 is used with a softmax activation of the softmax layer 486 to compute the joint probability distribution 187 representing probabilities of possible combinations of excitation values for the residual data 489A and the residual data 489B. The residual data 489A and the residual data 489B can be quantized (e.g., 8-bit mu-law quantized). An 8-bit quantized value corresponds to a count of possible values (e.g., $2^8$ or 256 values). The joint probability distribution 187 indicates a probability associated with each of the combinations (e.g., $256^2$ or 65536 combinations) of values of the residual data 489A and the residual data 489B.

In some implementations, the output of the FC layer 484 indicates mean values and a covariance matrix corresponding to the joint probability distribution 187 (e.g., a joint normal distribution) of the values of the residual data 489A and the residual data 489B. In these implementations, the values of the residual data 489A and the residual data 489B can correspond to real-values (e.g., dequantized values), as further described with reference to FIG. 4B.

Figure 5:
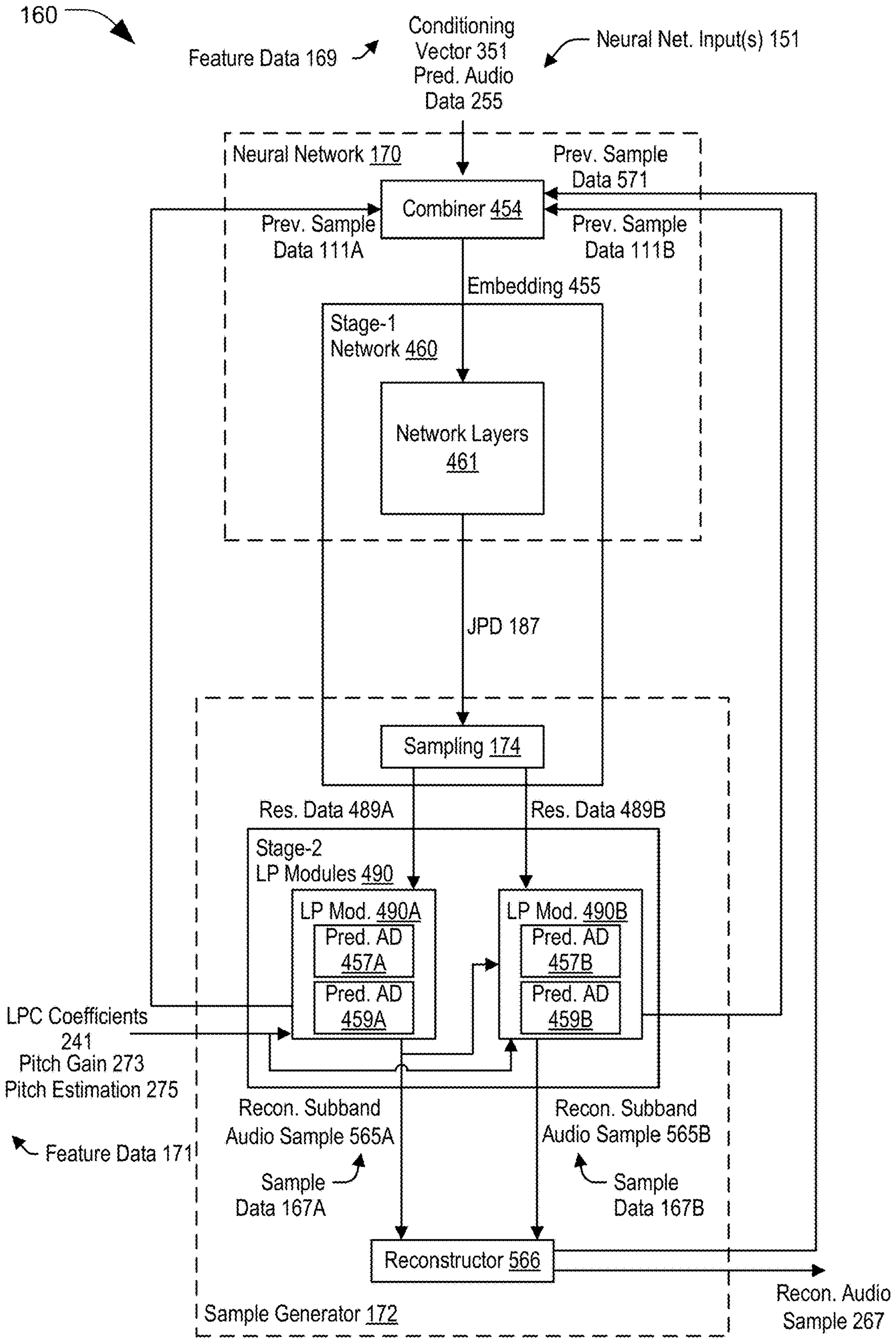
FIG. 5 is a diagram of another illustrative implementation of the sample generation network of any of the systems of FIGS. 1-3, in accordance with some examples of the present disclosure.

The joint probability distribution 187 corresponds to multi-sample joint probability distribution modeling in the examples of FIGS. 4A-4B, and corresponds to subband joint probability distribution modeling in the example of FIG. 5.

The sample generator 172 performs sampling 174 based on the joint probability distribution 187 to generate residual data 489. For example, the sample generator 172 selects a particular combination of values for the residual data 489A and the residual data 489B based on the probabilities indicated by the joint probability distribution 187.

The sample generator 172 provides the residual data 489 to the plurality of LP modules 490. For example, the sample generator 172 provides the residual data 489A and the residual data 489B to an LP module 490A and an LP module 490B, respectively, of the plurality of LP modules 490. The plurality of LP modules 490 including two LP modules 490 is provided as an illustrative example. In other examples, the plurality of LP modules 490 includes more than two LP modules (i.e., a particular count of LP modules 490 that is greater than two, such as four LP modules). In these examples, the joint probability distribution 187 indicates probabilities of combinations of values for the particular count (e.g., four) of sets of residual data, the sampling 174 is performed to generate the particular count of sets of residual data based on the joint probability distribution 187, and each set of residual data is provided to a respective LP module 490.

Each of the plurality of LP modules 490 generates a reconstructed audio sample 267 of the reconstructed audio signal 271. For example, the LP module 490A generates a reconstructed audio sample 267A of the reconstructed audio signal 271 based on the residual data 489A, the residual data 489B, the feature data 171, predicted audio data 457A, predicted audio data 459A, a previous reconstructed audio sample 267 generated by the LP module 490A during a previous iteration, or a combination thereof, as further described with reference to FIG. 6A. As another example, the LP module 490B generates a reconstructed audio sample 267B of the reconstructed audio signal 271 based on the residual data 489A, the residual data 489B, the feature data 171, predicted audio data 457B, predicted audio data 459B, the reconstructed audio sample 267A, a previous reconstructed audio sample 267 generated by the LP module 490B during a previous iteration, or a combination thereof, as further described with reference to FIG. 6A.

In a particular aspect, the predicted audio data 457A corresponds to predicted audio data (e.g., LTP data) generated by a LTP engine of the LP module 490A during a previous iteration. In a particular aspect, the predicted audio data 459A corresponds to predicted audio data (e.g., short-term LP data) generated by a short-term LP engine of the LP module 490A during the previous iteration. Similarly, the predicted audio data 457B corresponds to predicted audio data (e.g., LTP data) generated by a LTP engine of the LP module 490B during the previous iteration. In a particular aspect, the predicted audio data 459B corresponds to predicted audio data (e.g., short-term LP data) generated by a short-term LP engine of the LP module 490B during the previous iteration.

In a particular aspect, the plurality of LP modules 490 generates at least a portion of the one or more neural network inputs 151 for a subsequent iteration. For example, the plurality of LP modules 490 generates the predicted audio data 255 for the subsequent iteration. To illustrate, the LTP engine and the short-term LP engine of the LP module 490A generate next predicted audio data, as further described with reference to FIG. 6A. Similarly, the LTP engine and the short-term LP engine of the LP module 490B generate next predicted audio data, as further described with reference to FIG. 6A.

The next predicted audio data of the LTP engine and the short-term LP engine of the LP module 490A, the next predicted audio data of the LTP engine and the short-term LP engine of the LP module 490B, or both, are included in the predicted audio data 255 for the subsequent iteration. In a particular aspect, the residual data 489A and the residual data 489B are included in the previous sample data 111A and the previous sample data 111B, respectively, of the subsequent iteration.

In a particular aspect, the reconstructed audio sample 267A, an output of the LTP engine of the LP module 490A, an output of the short-term LP engine of the LP module 490A, or a combination thereof, are included in the previous sample data 111A for the subsequent iteration. Similarly, the reconstructed audio sample 267B, an output of the LTP engine of the LP module 490B, an output of the short-term LP engine of the LP module 490B, or a combination thereof, are included in the previous sample data 111B for the subsequent iteration. The joint probability distribution 187 that is generated during the subsequent iteration can be conditioned at least in part on the reconstructed audio sample 267A and the reconstructed audio sample 267B and can represent estimated inter-sample dependencies between a subsequent pair of reconstructed audio samples 267.

The LP module 490A and the LP module 490B are described as separate modules for ease of illustration. In other examples, the same LP module 490 generates the reconstructed audio sample 267B subsequent to generating the reconstructed audio sample 267A.

The reconstructed audio sample 267A and the reconstructed audio sample 267B are described as samples of the same reconstructed audio frame 253A as an illustrative example. In other examples, the reconstructed audio sample 267A and the reconstructed audio sample 267B are samples of different reconstructed audio frames. To illustrate, the audio synthesizer 250 may generate the reconstructed audio frame 253A including the reconstructed audio sample 267A and the reconstructed audio frame 253B including the reconstructed audio sample 267B. In such examples, the LP module 490A generates the reconstructed audio sample 267A based on the LPC coefficients 241, the pitch gain 273, the pitch estimation 275, or a combination thereof, of the audio frame 203A, and the LP module 490B generates the reconstructed audio sample 267B based on second LPC coefficients, a second pitch gain, a second pitch estimation, or a combination thereof, of the audio frame 203B.

In some further examples in which the sample generator 172 generates samples for multiple different frames per iteration, the encoded audio data 341 of FIG. 3 also indicates the second LPC coefficients, the second pitch gain, the second pitch estimation, or a combination thereof, and the frame rate network 350 determines the second LPC coefficients, the second pitch gain, the second pitch estimation, or a combination thereof, by decoding the encoded audio data 341. In some implementations, the encoded audio data 341 of FIG. 3 does not explicitly include the second LPC coefficients, the second pitch gain, the second pitch estimation, or a combination thereof, and the frame rate network 350 estimates the second LPC coefficients, the second pitch gain, the second pitch estimation, or a combination thereof, based on the features 343.

Referring to FIG. 4B, a diagram of an illustrative implementation of the sample generation network 160 is shown. The output of the FC layer 484 represents the joint probability distribution 187, and the sample generator 172 performs the sampling 174 based on the joint probability distribution 187 output by the FC layer 484. The network layers 461 do not include a softmax layer.

In a particular aspect, the residual data 489A and the residual data 489B are real-valued (e.g., non-quantized values) and the joint probability distribution 187 corresponds to a continuous distribution that models the distribution of values of the residual data 489A and the residual data 489B. In a particular aspect, the FC layer 484 outputs parameters of the joint probability distribution 187. In some implementations, the joint probability distribution 187 is modeled as a multivariate Gaussian distribution, and the FC layer 484 outputs the mean and covariance matrix of the Gaussian distribution. In some implementations, the joint probability distribution 187 is modeled as a mixture of Gaussians distribution, and the FC layer 484 outputs mixing coefficients, and the mean and covariance matrices for each of the mixture components.

The sample generator 172 performs sampling 174 based on the joint probability distribution 187 to generate residual data 489, as described with reference to FIG. 4A. For example, the sample generator 172 selects or generates a particular combination of values for the residual data 489A and the residual data 489B based on the parameters of the joint probability distribution 187 received from the FC layer 484.

Referring to FIG. 5, a diagram of an illustrative implementation of the sample generation network 160 is shown. The network 460 includes the network layers 461. In some examples, the network layers 461 correspond to the implementation described with reference to FIG. 4A. In some examples, the network layers 461 correspond to the implementation described with reference to FIG. 4B. In other examples, the network layers 461 can correspond to various other implementations.

In a particular aspect, each of the LP modules 490 is configured to generate a reconstructed subband audio sample 565 based on residual data 489. The sample generator 172 includes a reconstructor 566 (e.g., a subband reconstruction filterbank) that is configured to generate a reconstructed audio sample 267 based on the reconstructed subband audio samples 565 generated during one or more iterations by the plurality of LP modules 490.

Each of the plurality of LP modules 490 generates a reconstructed subband audio sample 565 of a reconstructed subband audio signal of the reconstructed audio signal 271. To illustrate, a first reconstructed subband audio signal of the reconstructed audio signal 271 corresponds to at least a first audio subband, and a second reconstructed subband audio signal of the reconstructed audio signal 271 corresponds to at least a second audio subband. The first audio subband is associated with a first range of frequencies, and the second audio subband is associated with a second range of frequencies, as further described with reference to FIGS. 7-9.

For example, the LP module 490A generates a reconstructed subband audio sample 565A of a first reconstructed subband audio signal of the reconstructed audio signal 271. The LP module 490A generates the reconstructed subband audio sample 565A based on the residual data 489A, the residual data 489B, the feature data 171, the predicted audio data 457A, the predicted audio data 459A, a previous reconstructed subband audio sample 565 of the first reconstructed subband audio signal, previous sample data 571 of a previous reconstructed audio sample, or a combination thereof, as further described with reference to FIG. 6B.

As another example, the LP module 490B generates a reconstructed subband audio sample 565B of a second reconstructed subband audio signal of the reconstructed audio signal 271. The LP module 490B generates the reconstructed subband audio sample 565B based on the residual data 489A, the residual data 489B, the feature data 171, the predicted audio data 457B, the predicted audio data 459B, the reconstructed subband audio sample 565A, a previous reconstructed subband audio sample 565 of the second reconstructed subband audio signal, the previous sample data 571 of a previous reconstructed audio sample, or a combination thereof, as further described with reference to FIG. 6B.

The plurality of LP modules 490 perform in a substantially similar manner as described with reference to FIG. 4A. For example, the plurality of LP modules 490 generate the predicted audio data 255 during one or more previous iterations. To illustrate, the LP module 490A generates the predicted audio data 457A and the predicted audio data 459A during a previous iteration. Similarly, the LP module 490B generates the predicted audio data 457B and the predicted audio data 459B during the previous iteration. The plurality of LP modules 490 generates at least a portion of the one or more neural network inputs 151 for a subsequent iteration. For example, the plurality of LP modules 490 generates the predicted audio data 255, the previous sample data 111, or a combination thereof, for the subsequent iteration.

In a particular aspect, the LP module 490A and the LP module 490B generate next predicted audio as the predicted audio data 255 for the subsequent iteration, as further described with reference to FIG. 6B. In a particular aspect, the residual data 489A and the residual data 489B are included in the previous sample data 111A and the previous sample data 111B, respectively, of the subsequent iteration.

In a particular aspect, the reconstructed subband audio sample 565A, an output of the LTP engine of the LP module 490A, an output of the short-term engine of the LP module 490A, or a combination thereof, are included in the previous sample data 111A for the subsequent iteration. In a particular aspect, the reconstructed subband audio sample 565B, an output of the LTP engine of the LP module 490B, an output of the short-term LP engine of the LP module 490B, or a combination thereof, are included in the previous sample data 111B for the subsequent iteration. The joint probability distribution 187 generated during the subsequent iteration is based on the reconstructed subband audio sample 565A and the reconstructed subband audio sample 565B, and takes into account estimated local (e.g., inter-subband) dependencies between subsequent sets of reconstructed subband audio samples 565.

The reconstructor 566 generates a reconstructed audio sample 267 based on the reconstructed subband audio sample 565A, the reconstructed subband audio sample 565B, one or more additional reconstructed subband audio samples, or a combination thereof. In a particular aspect, the reconstructor 566 includes a subband reconstruction filterbank, such as a quadrature mirror filter (QMF), a pseudo QMF, a Gabor filterbank, etc. The reconstructor 566 can perform sub-band processing that is either critically sampled or oversampled. Oversampling enables transfer ripple vs aliasing operating points that are not possible to achieve with critical sampling. For example, for a particular transfer ripple specification, a critically sampled filterbank can limit aliasing to at most a particular threshold level, but an oversampled filterbank could decrease aliasing further while maintaining the same transfer ripple specification. Oversampling reduces some burden from the plurality of LP modules 490 in terms of the plurality of LP modules 490 trying to match aliasing components across audio sub-bands with precision to achieve aliasing cancellation. Even if aliasing components don't match precisely and the aliasing does not exactly cancel, the final output quality of the reconstructed audio sample 267 is likely to be acceptable if aliasing within each sub-band is relatively low to begin with. In a particular aspect, the reconstructor 566 provides the reconstructed audio sample 267 to the combiner 454 as the previous sample data 571 for the subsequent iteration.

In some examples, the reconstructor 566 can generate multiple reconstructed audio samples from the reconstructed subband audio sample 565A, the reconstructed subband audio sample 565B, one or more additional reconstructed audio samples, or a combination thereof. In an illustrative example, the reconstructor 566 includes a critically sampled 2-band filterbank. The audio signal 205 (e.g., s[n]) has a first sampling rate (e.g., 16 kilohertz (kHz)) and is encoded as a first subband audio signal (e.g., s_L[n]) and a second subband audio signal (e.g., s_H[n]). Each of the first subband audio signal (e.g., s_L[n]) and the second subband audio signal (e.g., s_H[n]) has a second sampling rate (e.g., 8 kHz) that is half of the first sampling rate (e.g., 16 kHz). The reconstructor 566 generates a first reconstructed subband audio signal (e.g., including the reconstructed subband audio sample 565A) and a second reconstructed audio signal (e.g., including the reconstructed subband audio sample 565B) that represent reconstructed versions of the first subband audio signal and the second subband audio signal, respectively.

The reconstructor 566 upsamples and filters each of the first reconstructed subband audio signal and the second reconstructed audio signal, and adds the resultant upsampled filtered signals to generate the reconstructed audio signal 271, which has twice the sample rate of the first reconstructed subband audio signal and the second reconstructed audio signal. Thus, a frame of N reconstructed samples of the first reconstructed subband audio signal (e.g., s_L) and a corresponding frame of N reconstructed samples of the second reconstructed subband audio signal (e.g., s_H) input to the reconstructor 566 results in an output of 2N reconstructed samples (e.g., 2 frames) of the reconstructed audio signal 271. The reconstructor 566 can thus generate multiple reconstructed audio samples (e.g., two reconstructed audio samples) based on the reconstructed subband audio sample 565A and the reconstructed subband audio sample 565B in each iteration.

The LP module 490A and the LP module 490B are described as separate modules for ease of illustration. In other examples, the same LP module 490 generates the reconstructed subband audio sample 565B subsequent to generating the reconstructed subband audio sample 565A.

The one or more neural network inputs 151 including previous sample data 111, predicted audio data 255, or a combination thereof, associated with two previous audio samples in FIGS. 4A-4B or two previous subband audio samples in FIG. 5 are provided as illustrative examples. In some examples, the one or more neural network inputs 151 can include previous sample data 111, predicted audio data 255, or a combination thereof, associated with more than two previous audio samples or more than two previous subband audio samples.

Figure 6A:
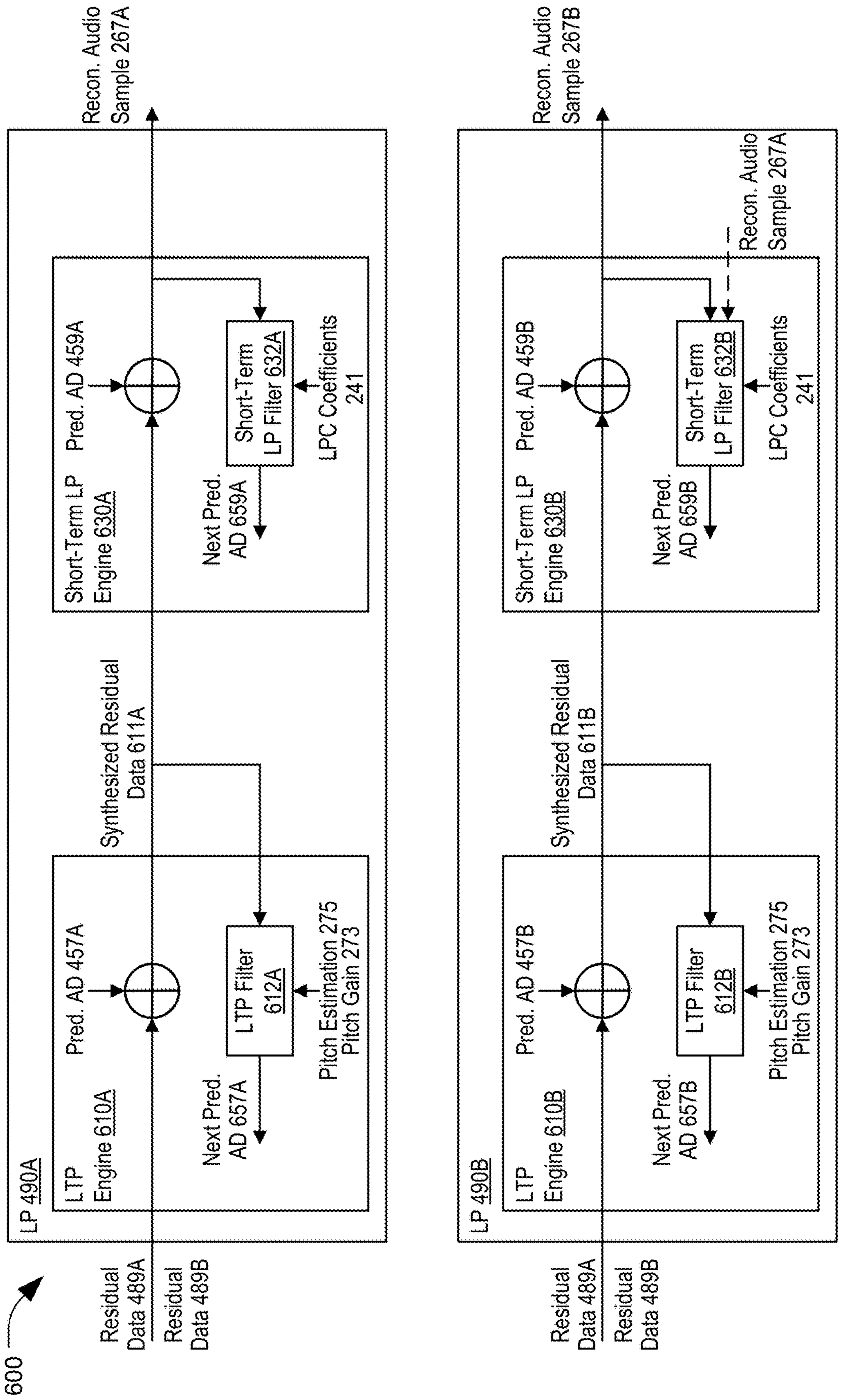
FIG. 6A is a diagram of illustrative implementations of linear prediction (LP) modules of the sample generation network of FIGS. 4A-4B, in accordance with some examples of the present disclosure.

Referring to FIG. 6A, a diagram 600 of an illustrative implementation of the LP module 490A and the LP module 490B of the sample generation network 160 of FIG. 4A is shown. The LP module 490A includes a LTP engine 610A coupled to a short-term LP engine 630A. The LTP engine 610A includes a LTP filter 612A, and the short-term LP engine 630A includes a short-term LP filter 632A. The LP module 490B includes a LTP engine 610B coupled to a short-term LP engine 630B. The LTP engine 610B includes a LTP filter 612B, and the short-term LP engine 630B includes a short-term LP filter 632B.

In a particular aspect, residual data 489 corresponds to an excitation signal, predicted audio data 457 and predicted audio data 459 correspond to a prediction, and an LP module 490 is configured to combine the excitation signal (e.g., the residual data 489) with the prediction (e.g., the predicted audio data 457 and the predicted audio data 459) to generate a reconstructed audio sample 267. For example, the LTP engine 610A combines the predicted audio data 457A with the residual data 489A to generate synthesized residual data 611A (e.g., LP residual data). The short-term LP engine 630A combines the synthesized residual data 611A with the predicted audio data 459A to generate the reconstructed audio sample 267A. As another example, the LTP engine 610B combines the predicted audio data 457B with the residual data 489B to generate synthesized residual data 611B (e.g., LP residual data). The short-term LP engine 630B combines the synthesized residual data 611B with the predicted audio data 459B to generate the reconstructed audio sample 267B.

In some implementations, the LTP engine 610 combines the predicted audio data 457 with residual data associated with another audio sample to generate the synthesized residual data 611. For example, the LTP engine 610A combines the predicted audio data 457A with the residual data 489A and residual data (e.g., the residual data 489B) associated with one or more other audio samples to generate the synthesized residual data 611A. As another example, the LTP engine 610B combines the predicted audio data 457B with the residual data 489B and residual data (e.g., the residual data 489A) associated with one or more other audio samples to generate the synthesized residual data 611B.

The LP module 490 is configured to generate a prediction for a subsequent iteration. For example, the LTP filter 612 generates next predicted audio data 657 (e.g., next long-term predicted data) based on the synthesized residual data 611, the pitch gain 273, the pitch estimation 275, or a combination thereof. To illustrate, the LTP filter 612A generates next predicted audio data 657A (e.g., next long-term predicted data) based on the synthesized residual data 611A, the pitch gain 273, the pitch estimation 275, or a combination thereof. The LTP filter 612B generates next predicted audio data 657B (e.g., next long-term predicted data) based on the synthesized residual data 611B, the pitch gain 273, the pitch estimation 275, or a combination thereof. In a particular aspect, the next predicted audio data 657A and the next predicted audio data 657B are used as the predicted audio data 457A and the predicted audio data 457B, respectively, in the subsequent iteration.

The short-term LP filter 632 generates next predicted audio data 659 (e.g., next short-term predicted data) based on the reconstructed audio sample 267, the LPC coefficients 241, one or more other sets of reconstructed audio data received from one or more other LP modules 490, or a combination thereof. For example, the short-term LP filter 632A generates next predicted audio data 659A (e.g., next short-term predicted data) based on the reconstructed audio sample 267A, the LPC coefficients 241, or a combination thereof. As another example, the short-term LP filter 632B generates next predicted audio data 659B (e.g., next short-term predicted data) based on the reconstructed audio sample 267A received from the LP module 490A, the reconstructed audio sample 267B, the LPC coefficients 241, or a combination thereof. In a particular aspect, the next predicted audio data 659A and the next predicted audio data 659B are used as the predicted audio data 459A and the predicted audio data 459B, respectively, in the subsequent iteration.

In a particular aspect, the LP module 490 outputs previous sample data 111 for the subsequent iteration. For example, the residual data 489A, the synthesized residual data 611A, the reconstructed audio sample 267A, or a combination thereof, are included in the previous sample data 111A for the subsequent iteration. As another example, the residual data 489B, the synthesized residual data 611B, the reconstructed audio sample 267B, or a combination thereof, are included in the previous sample data 111B for the subsequent iteration.

The reconstructed audio sample 267A and the reconstructed audio sample 267B are described as samples of the same reconstructed audio frame 253A as an illustrative example. In other examples, the reconstructed audio sample 267A and the reconstructed audio sample 267B are samples of different reconstructed audio frames. To illustrate, the audio synthesizer 250 may generate the reconstructed audio frame 253A including the reconstructed audio sample 267A and the reconstructed audio frame 253B including the reconstructed audio sample 267B. In such examples, the LP module 490A generates the reconstructed audio sample 267A based on the LPC coefficients 241, the pitch gain 273, the pitch estimation 275, or a combination thereof, of the audio frame 203A, and the LP module 490B generates the reconstructed audio sample 267B based on second LPC coefficients, a second pitch gain, a second pitch estimation, or a combination thereof, of the audio frame 203B.

The diagram 600 provides an illustrative non-limiting example of an implementation of the LP modules 490 of the sample generation network 160 of FIGS. 4A-4B. In other examples, the LP modules 490 of the sample generation network 160 can have various other implementations. For example, in a particular implementation, the residual data 489 is processed by the short-term LP engine 630 prior to processing of an output of the short-term LP engine 630 by the LTP engine 610. In this implementation, an output of the LTP engine 610 corresponds to the reconstructed audio sample 267. In some implementations, an LP module 490 includes a short-term LP engine 630, and does not include a LTP engine 610. For example, the residual data 489 is provided to the short-term LP engine 630, and the short-term LP engine 630 generates a reconstructed audio sample 267 based on the residual data 489 and the predicted audio data 459, independently of (e.g., without generating) synthesized residual data 611.

Figure 6B:
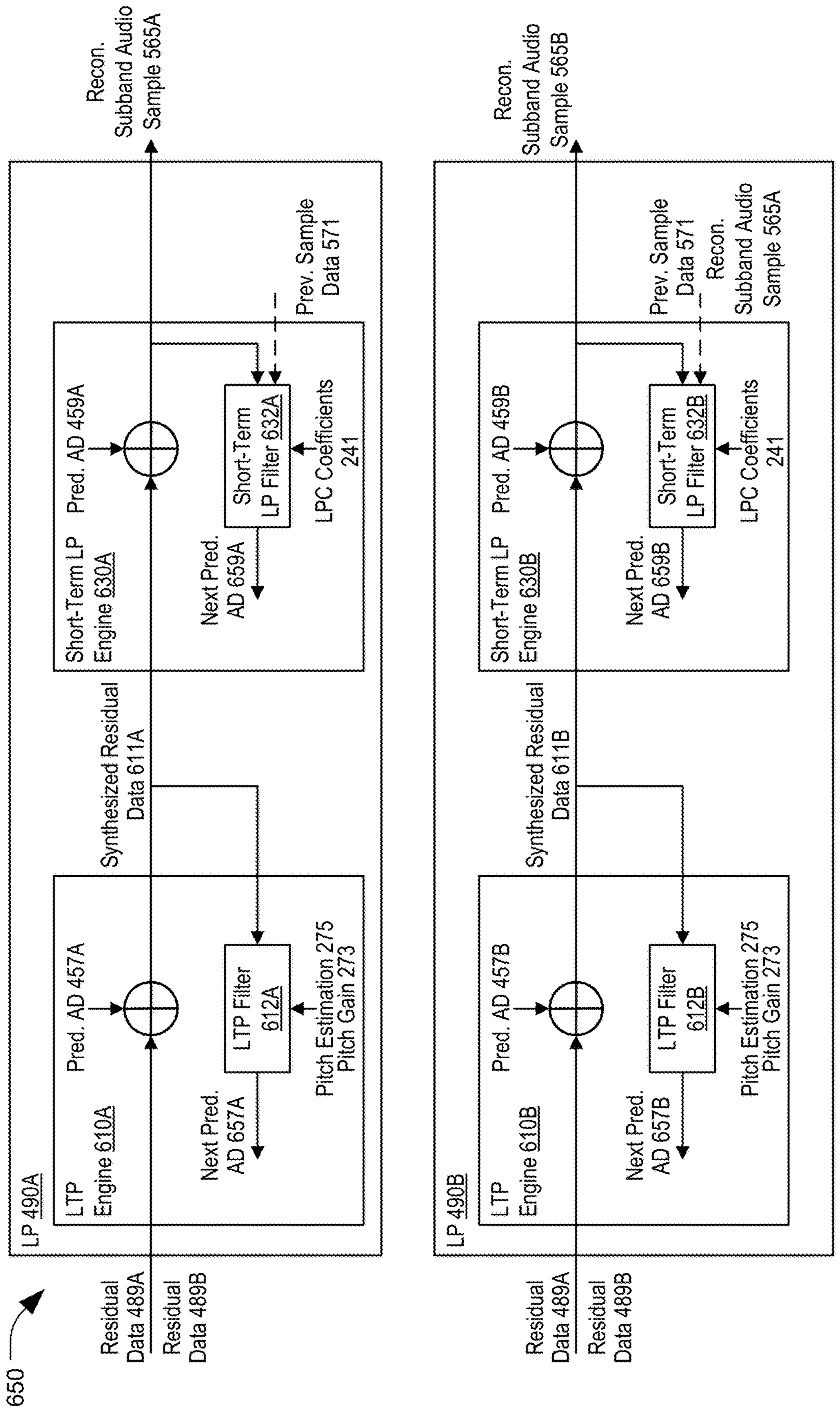
FIG. 6B is a diagram of illustrative implementations of LP modules of the sample generation network of FIG. 5, in accordance with some examples of the present disclosure.

Referring to FIG. 6B, a diagram 650 of an illustrative implementation of the LP module 490A and the LP module 490B of the sample generation network 160 of FIG. 5 is shown.

In a particular aspect, the LTP engine 610A combines the predicted audio data 457A with the residual data 489A to generate synthesized residual data 611A (e.g., LP residual data). The short-term LP engine 630A combines the synthesized residual data 611A with the predicted audio data 459A to generate the reconstructed subband audio sample 565A. The LTP engine 610B combines the predicted audio data 457B with the residual data 489B to generate synthesized residual data 611B (e.g., LP residual data). The short-term LP engine 630B combines the synthesized residual data 611B with the predicted audio data 459B to generate the reconstructed subband audio sample 565B.

In some implementations, the LTP engine 610 combines the predicted audio data 457 with residual data associated with another audio subband to generate the synthesized residual data 611. For example, the LTP engine 610A combines the predicted audio data 457A with the residual data 489A and residual data (e.g., the residual data 489B) associated with one or more other audio subbands to generate the synthesized residual data 611A. As another example, the LTP engine 610B combines the predicted audio data 457B with the residual data 489B and residual data (e.g., the residual data 489A) associated with one or more other audio subbands to generate the synthesized residual data 611B.

The LP module 490 is configured to generate a prediction for a subsequent iteration. For example, the LTP filter 612 generates next predicted audio data 657 (e.g., next long-term predicted data) based on the synthesized residual data 611, the pitch gain 273, the pitch estimation 275, or a combination thereof. To illustrate, the LTP filter 612A generates next predicted audio data 657A (e.g., next long-term predicted data) based on the synthesized residual data 611A, the pitch gain 273, the pitch estimation 275, or a combination thereof. The LTP filter 612B generates next predicted audio data 657B (e.g., next long-term predicted data) based on the synthesized residual data 611B, the pitch gain 273, the pitch estimation 275, or a combination thereof. In a particular aspect, the next predicted audio data 657A and the next predicted audio data 657B are used as the predicted audio data 457A and the predicted audio data 457B, respectively, in the subsequent iteration.

The short-term LP filter 632 generates next predicted audio data 659 (e.g., next short-term predicted data) based on the reconstructed subband audio sample 565, the LPC coefficients 241, one or more other sets of reconstructed subband audio samples received from one or more other LP modules 490, a previous reconstructed audio sample, or a combination thereof. For example, the short-term LP filter 632A generates next predicted audio data 659A (e.g., next short-term predicted data) based on the reconstructed subband audio sample 565A, the LPC coefficients 241, the previous sample data 571, or a combination thereof. As another example, the short-term LP filter 632B generates next predicted audio data 659B (e.g., next short-term predicted data) based on the reconstructed subband audio sample 565A received from the LP module 490A, the reconstructed subband audio sample 565B, the LPC coefficients 241, the previous sample data 571, or a combination thereof.

In some implementations, the LPC coefficients 241 include different LPC coefficients associated with different audio subbands. For example, the LPC coefficients 241 include first LPC coefficients associated with the first audio subband and second LPC coefficients associated with the second audio subband, where the second LPC coefficients are distinct from the first LPC coefficients. In these implementations, the short-term LP filter 632A generates the next predicted audio data 659A (e.g., next short-term predicted data) based on the first LPC coefficients of the LPC coefficients 241, the reconstructed subband audio sample 565A, the previous sample data 571, or a combination thereof. The short-term LP filter 632B generates next predicted audio data 659B (e.g., next short-term predicted data) based on the second LPC coefficients of the LPC coefficients 241, the reconstructed subband audio sample 565A received from the LP module 490A, the reconstructed subband audio sample 565B, the previous sample data 571, or a combination thereof.

In a particular aspect, the next predicted audio data 659A and the next predicted audio data 659B are used as the predicted audio data 459A and the predicted audio data 459B, respectively, in the subsequent iteration. In a particular aspect, the LP module 490 outputs previous sample data 111 for the subsequent iteration. For example, the residual data 489A, the synthesized residual data 611A, the reconstructed subband audio sample 565A, or a combination thereof, are included in the previous sample data 111A for the subsequent iteration. As another example, the residual data 489B, the synthesized residual data 611B, the reconstructed subband audio sample 565B, or a combination thereof, are included in the previous sample data 111B for the subsequent iteration.

The diagram 650 provides an illustrative non-limiting example of an implementation of the LP modules 490 of the sample generation network 160 of FIG. 5. In other examples, the LP modules 490 of the sample generation network 160 can have various other implementations. For example, in a particular implementation, the residual data 489 is processed by the short-term LP engine 630 prior to processing of an output of the short-term LP engine 630 by the LTP engine 610. In this implementation, an output of the LTP engine 610 corresponds to the reconstructed subband audio sample 565. In some implementations, an LP module 490 includes a short-term LP engine 630, and does not include a LTP engine 610. For example, the residual data 489 is provided to the short-term LP engine 630, and the short-term LP engine 630 generates a reconstructed subband audio sample 565 based on the residual data 489 and the predicted audio data 459, independently of (e.g., without generating) synthesized residual data 611.

Figure 7:
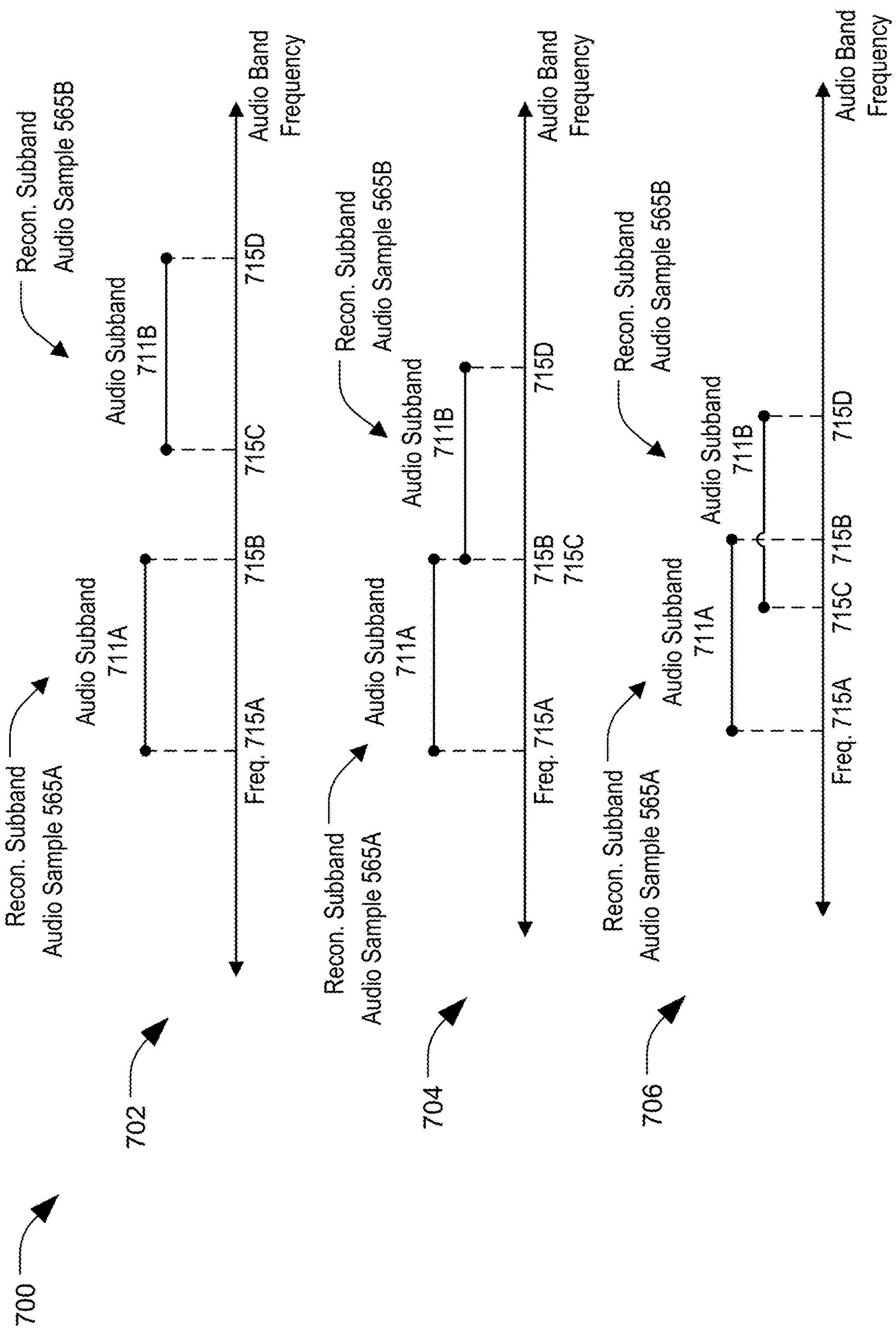
FIG. 7 is a diagram of illustrative examples of audio subbands corresponding to sample data generated by any of the systems of FIGS. 1-3, in accordance with some examples of the present disclosure.

Referring to FIG. 7, a diagram 700 of illustrative examples of audio subbands corresponding to sample data 167 is shown. In a particular aspect, the sample data 167 is generated by the sample generation network 160 of FIG. 1.

In a particular aspect, the reconstructed subband audio sample 565A of FIG. 5 represents audio of an audio subband 711A. The audio subband 711A includes a first range of frequencies (e.g., a first frequency range) from a frequency 715A to a frequency 715B, where the frequency 715B is greater than (e.g., higher than) the frequency 715A. In a particular aspect, the reconstructed subband audio sample 565B represents audio of an audio subband 711B. The audio subband 711B includes a second range of frequencies (e.g., a second frequency range) from a frequency 715C to a frequency 715D, where the frequency 715D is greater than (e.g., higher than) the frequency 715C.

In an example 702, the first frequency range of the audio subband 711A and the second frequency range of the audio subband 711B are non-overlapping and non-consecutive. To illustrate, the frequency 715C is higher than the frequency 715B.

In an example 704, the first frequency range of the audio subband 711A and the second frequency range of the audio subband 711B are non-overlapping and consecutive. To illustrate, the frequency 715C is equal to the frequency 715B.

In an example 706, the first frequency range of the audio subband 711A at least partially overlaps the second frequency range of the audio subband 711B. To illustrate, the frequency 715C is greater than (e.g., higher than) the frequency 715A and less than (e.g., lower than) the frequency 715B.

The reconstructed subband audio sample 565A and the reconstructed subband audio sample 565B representing the audio subband 711A and the audio subband 711B, respectively, is provided as an illustrative example. In other examples, the reconstructed subband audio sample 565A and the reconstructed subband audio sample 565B can represent the audio subband 711B and the audio subband 711A, respectively.

In some examples, the first frequency range of the audio subband 711A has the same width as the second frequency range of the audio subband 711B. For example, a difference between the frequency 715A and the frequency 715B is the same as a difference between the frequency 715C and the frequency 715D. In some examples, the first frequency range of audio subband 711A is wider than the second frequency range of the audio subband 711B. For example, a difference between the frequency 715A and the frequency 715B is greater than a difference between the frequency 715C and the frequency 715D. In some examples, the first frequency range of audio subband 711A is narrower than the second frequency range of the audio subband 711B. For example, a difference between the frequency 715A and the frequency 715B is less than a difference between the frequency 715C and the frequency 715D.

Figure 8:
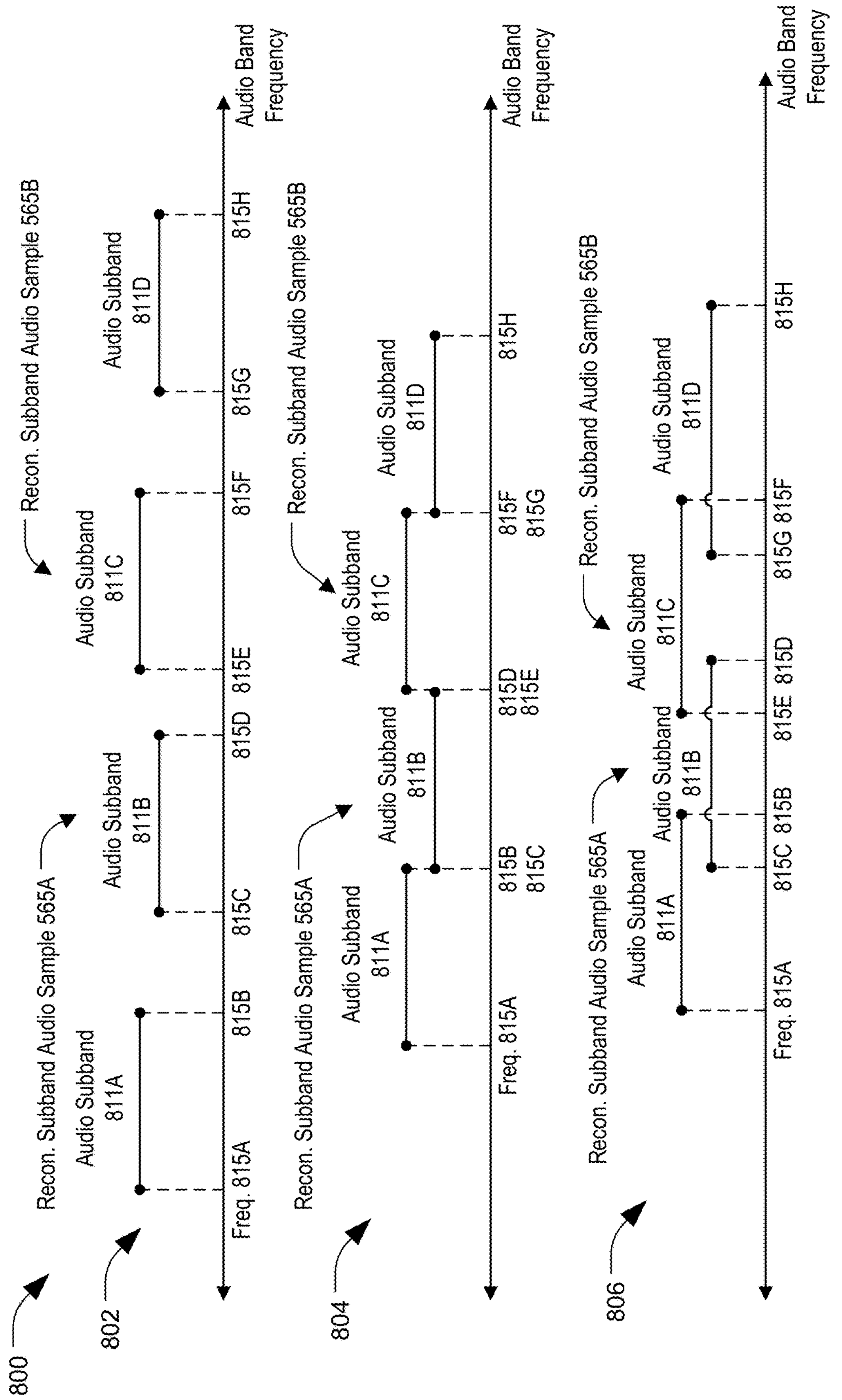
FIG. 8 is a diagram of additional illustrative examples of audio subbands corresponding to sample data generated by any of the systems of FIGS. 1-3, in accordance with some examples of the present disclosure.

Referring to FIG. 8, a diagram 800 of illustrative examples of audio subbands corresponding to sample data 167 is shown. In a particular aspect, the sample data 167 is generated by the sample generation network 160 of FIG. 1.

An audio subband 811A includes a first frequency range from a frequency 815A to a frequency 815B, where the frequency 815B is greater than (e.g., higher than) the frequency 815A. An audio subband 811B includes a second frequency range from a frequency 815C to a frequency 815D, where the frequency 815D is greater than (e.g., higher than) the frequency 815C. An audio subband 811C includes a third frequency range from a frequency 815E to a frequency 815F, where the frequency 815F is greater than (e.g., higher than) the frequency 815E. An audio subband 811D includes a fourth frequency range from a frequency 815G to a frequency 815H, where the frequency 815H is greater than (e.g., higher than) the frequency 815G. Four audio subbands are shown as an illustrative examples. In other examples, an audio band can be subdivided into fewer than four subbands or more than four subbands.

In a particular aspect, the reconstructed subband audio sample 565A of FIG. 5 represents the audio subband 811B and the reconstructed subband audio sample 565B of FIG. 5 represents the audio subband 811C. The reconstructed subband audio sample 565A of FIG. 5 representing the audio subband 811B and the reconstructed subband audio sample 565B of FIG. 5 representing the audio subband 811C is provided as an illustrative example. In other examples, the reconstructed subband audio sample 565A of FIG. 5 represents audio of any one of the audio subband 811A, the audio subband 811B, the audio subband 811C, or the audio subband 811D, and the reconstructed subband audio sample 565B of FIG. 5 represents audio of any other one of the audio subband 811A, the audio subband 811B, the audio subband 811C, or the audio subband 811D.

In an example 802, the first frequency range of the audio subband 811A, the second frequency range of the audio subband 811B, the third frequency range of the audio subband 811C, and the fourth frequency range of the audio subband 811D are non-overlapping and non-consecutive. To illustrate, the frequency 815C is greater (e.g., higher) than the frequency 815B, the frequency 815E is greater (e.g., higher) than the frequency 815D, and the frequency 815G is greater (e.g., higher) than the frequency 815F.

In an example 804, the first frequency range of the audio subband 811A, the second frequency range of the audio subband 811B, the third frequency range of the audio subband 811C, and the fourth frequency range of the audio subband 811D are non-overlapping and consecutive. To illustrate, the frequency 815C is equal to the frequency 815B, the frequency 815E is equal to the frequency 815D, and the frequency 815G is equal to the frequency 815F.

In an example 806, the first frequency range of the audio subband 811A at least partially overlaps the second frequency range of the audio subband 811B, the second frequency range at least partially overlaps the third frequency range of the audio subband 811C, and the third frequency range at least partially overlaps and the fourth frequency range of the audio subband 811D. To illustrate, the frequency 815C is greater than (e.g., higher than) the frequency 815A and less than (e.g., lower than) the frequency 815B, the frequency 815E is greater than (e.g., higher than) the frequency 815C and less than (e.g., lower than) the frequency 815D, and the frequency 815G is greater than (e.g., higher than) the frequency 815E and less than (e.g., lower than) the frequency 815F.

In some examples, each of the first frequency range of the audio subband 811A, the second frequency range of the audio subband 811B, the third frequency range of the audio subband 811C, and the fourth frequency range of the audio subband 811D has the same width. In other examples, at least one of the first frequency range, the second frequency range, the third frequency range, or the fourth frequency range is wider than at least another one of the first frequency range, the second frequency range, the third frequency range, or the fourth frequency range.

Figure 9:
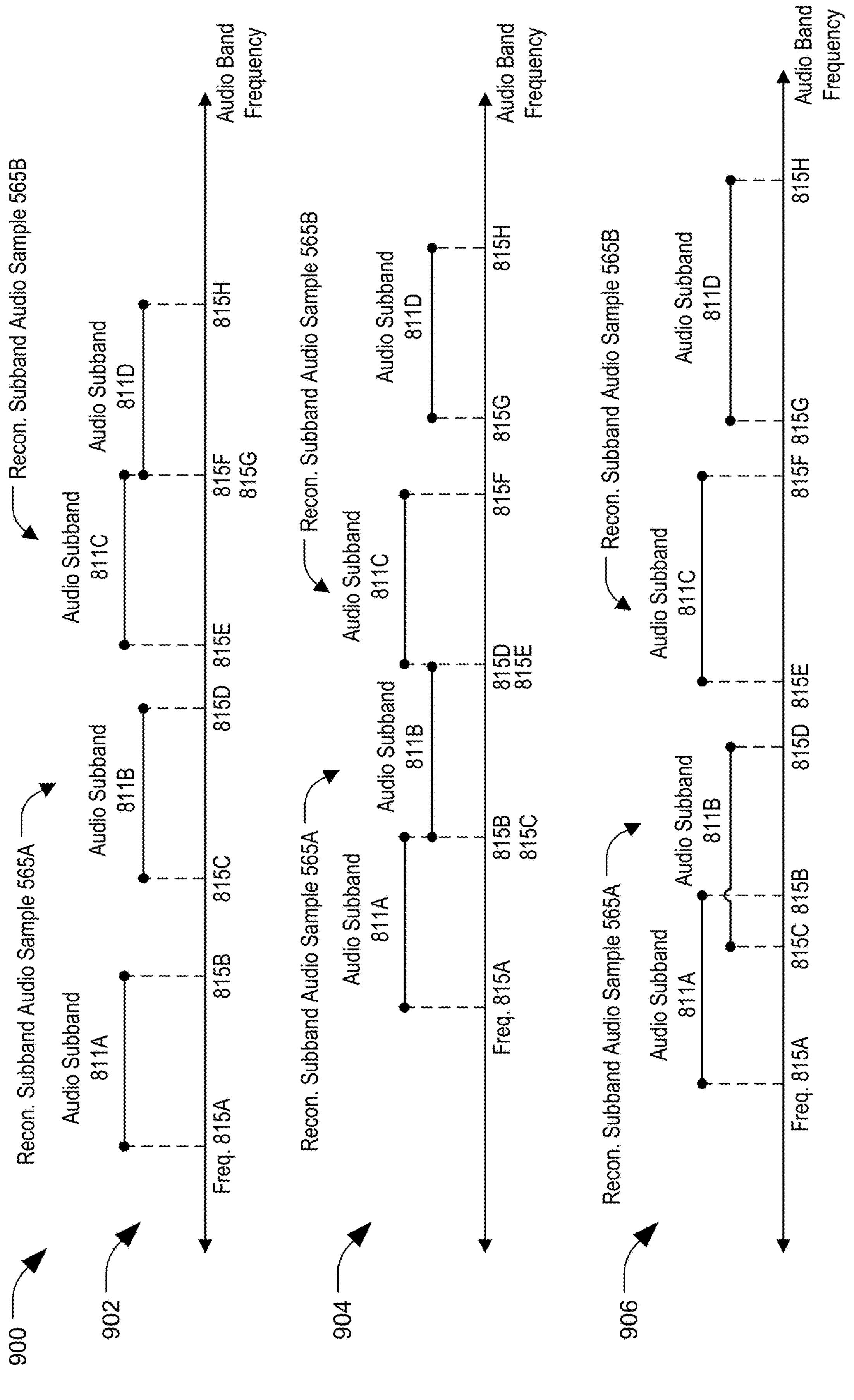
FIG. 9 is a diagram of additional illustrative examples of audio subbands corresponding to sample data generated by any of the systems of FIGS. 1-3, in accordance with some examples of the present disclosure.

Referring to FIG. 9, a diagram 900 of illustrative examples of audio subbands corresponding to sample data 167 is shown. In a particular aspect, the sample data 167 is generated by the sample generation network 160 of FIG. 1. An audio band can be divided into subbands that are a combination of non-overlapping, non-consecutive, consecutive, or partially overlapping frequency ranges.

In an example 902, the first frequency range of the audio subband 811A, the second frequency range of the audio subband 811B, the third frequency range of the audio subband 811C, and the fourth frequency range of the audio subband 811D are non-overlapping. The first frequency range of the audio subband 811A, the second frequency range of the audio subband 811B, and the third frequency range of the audio subband 811C are non-consecutive. To illustrate, the frequency 815C is greater (e.g., higher) than the frequency 815B, and the frequency 815E is greater (e.g., higher) than the frequency 815D. The third frequency range of the audio subband 811C and the fourth frequency range of the audio subband 811D are consecutive. For example, the frequency 815G is equal to the frequency 815F.

In an example 904, the first frequency range of the audio subband 811A, the second frequency range of the audio subband 811B, the third frequency range of the audio subband 811C, and the fourth frequency range of the audio subband 811D are non-overlapping. The first frequency range of the audio subband 811A is consecutive to the second frequency range of the audio subband 811B, and the second frequency range is consecutive to the third frequency range of the audio subband 811C. To illustrate, the frequency 815C is equal to the frequency 815B, and the frequency 815E is equal to the frequency 815D. The third frequency range of the audio subband 811C and the fourth frequency range of the audio subband 811D are non-consecutive. For example, the frequency 815G is greater than (e.g., higher than) the frequency 815F.

In an example 906, the first frequency range of the audio subband 811A at least partially overlaps the second frequency range of the audio subband 811B. To illustrate, the frequency 815C is greater than (e.g., higher than) the frequency 815A and less than (e.g., lower than) the frequency 815B. The second frequency range of the audio subband 811B, the third frequency range of the audio subband 811C, and the fourth frequency range of the audio subband 811D are non-overlapping and non-consecutive. To illustrate, the frequency 815E is greater than (e.g., higher than) the frequency 815D and the frequency 815G is greater than (e.g., higher than) the frequency 815F.

The diagram 900 provides some illustrative non-limiting examples of combinations of subbands with non-overlapping, non-consecutive, consecutive, or partially overlapping frequency ranges. An audio band can include various other combinations of subbands with non-overlapping, non-consecutive, consecutive, or partially overlapping frequency ranges.

Figure 10:
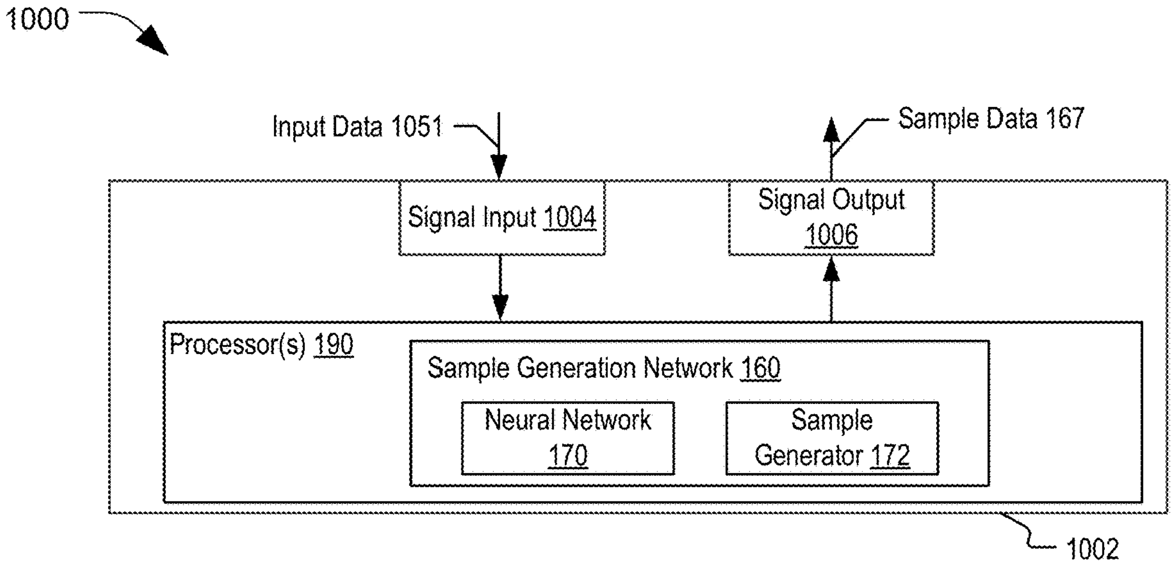
FIG. 10 illustrates an example of an integrated circuit operable to generate sample data based on joint probability distribution, in accordance with some examples of the present disclosure.
Figure 14:
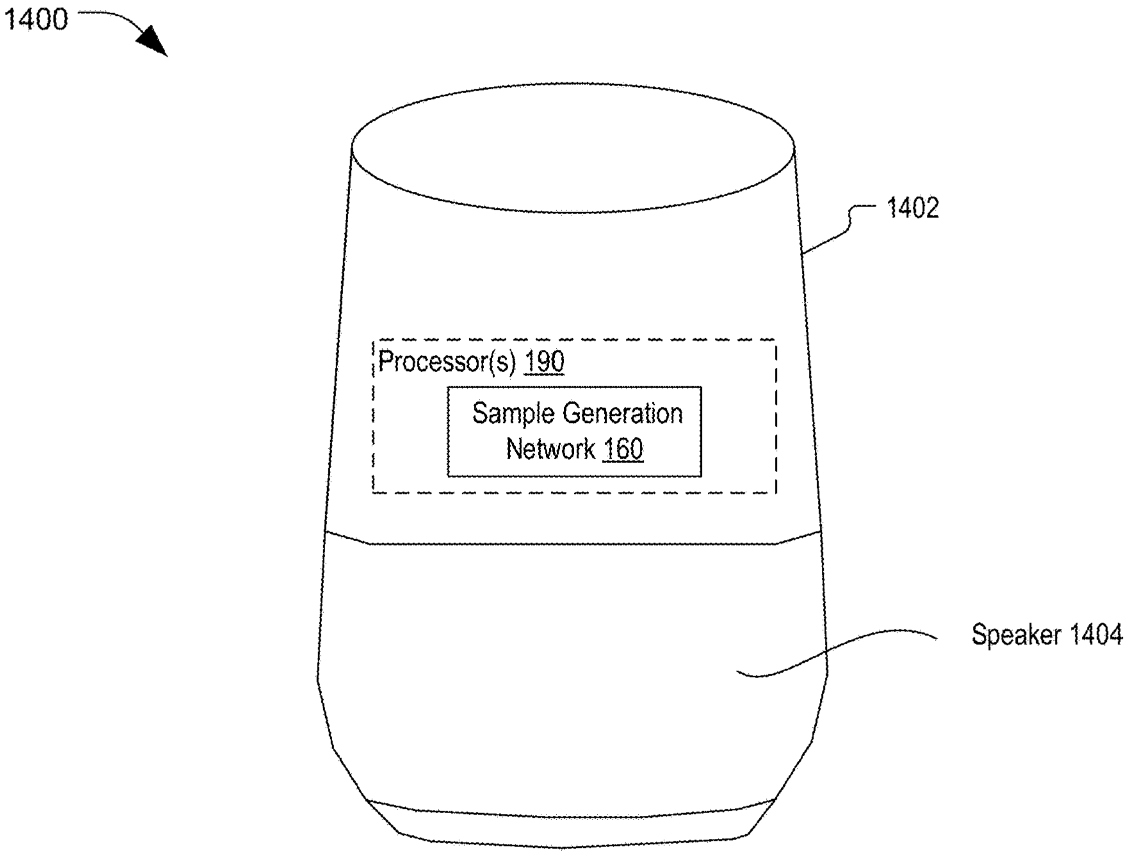
FIG. 14 is a diagram of a voice-controlled speaker system operable to generate sample data based on joint probability distribution, in accordance with some examples of the present disclosure.
Figure 15:
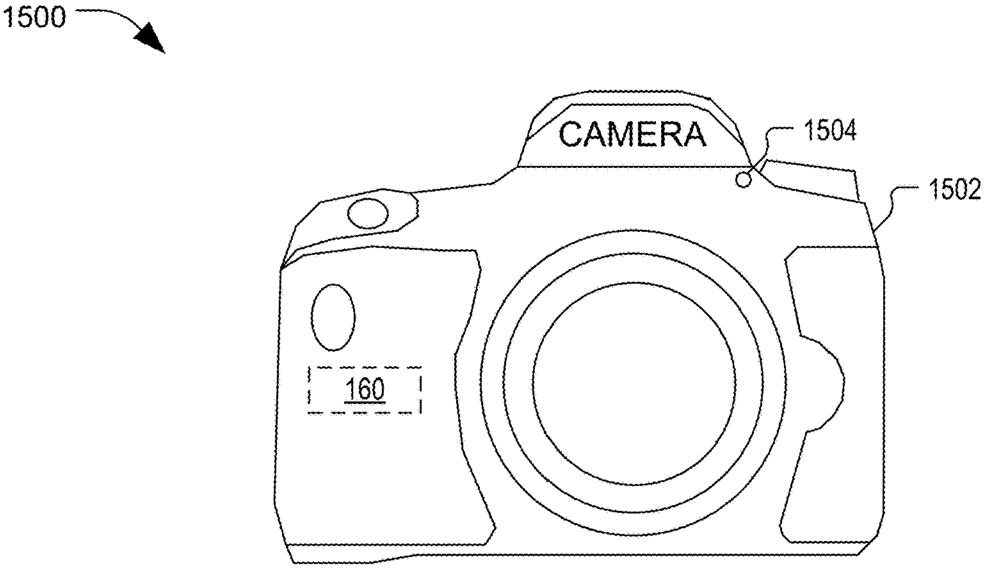
FIG. 15 is a diagram of a camera operable to generate sample data based on joint probability distribution, in accordance with some examples of the present disclosure.
Figure 16:
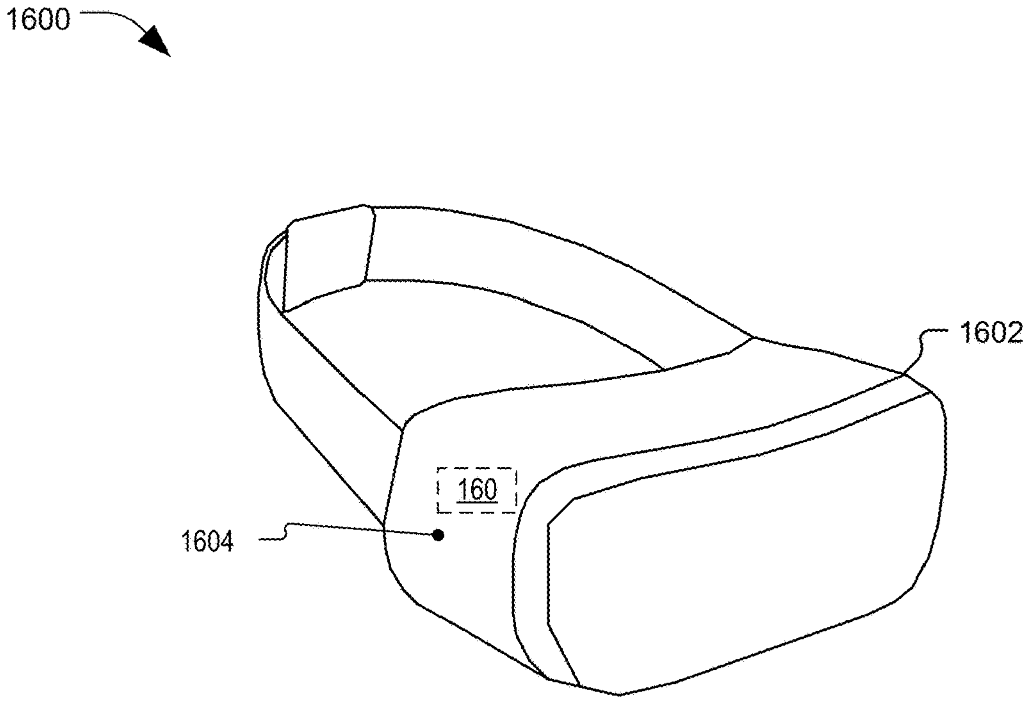
FIG. 16 is a diagram of a headset, such as a virtual reality, mixed reality, or augmented reality headset, operable to generate sample data based on joint probability distribution, in accordance with some examples of the present disclosure.
Figure 17:
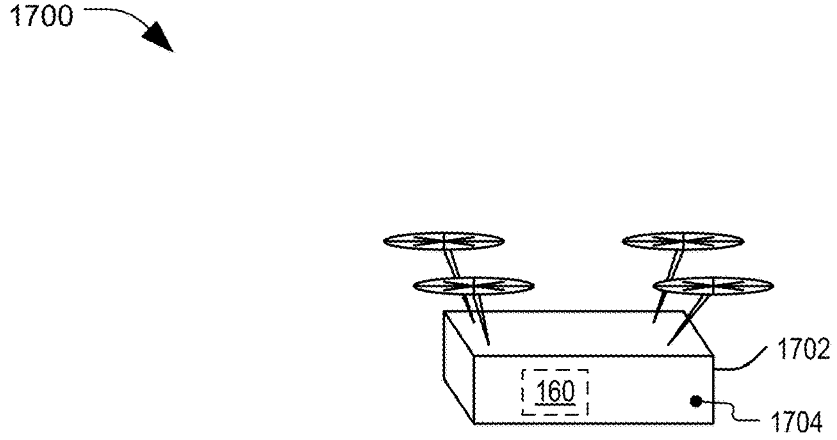
FIG. 17 is a diagram of a first example of a vehicle operable to generate sample data based on joint probability distribution, in accordance with some examples of the present disclosure.
Figure 18:
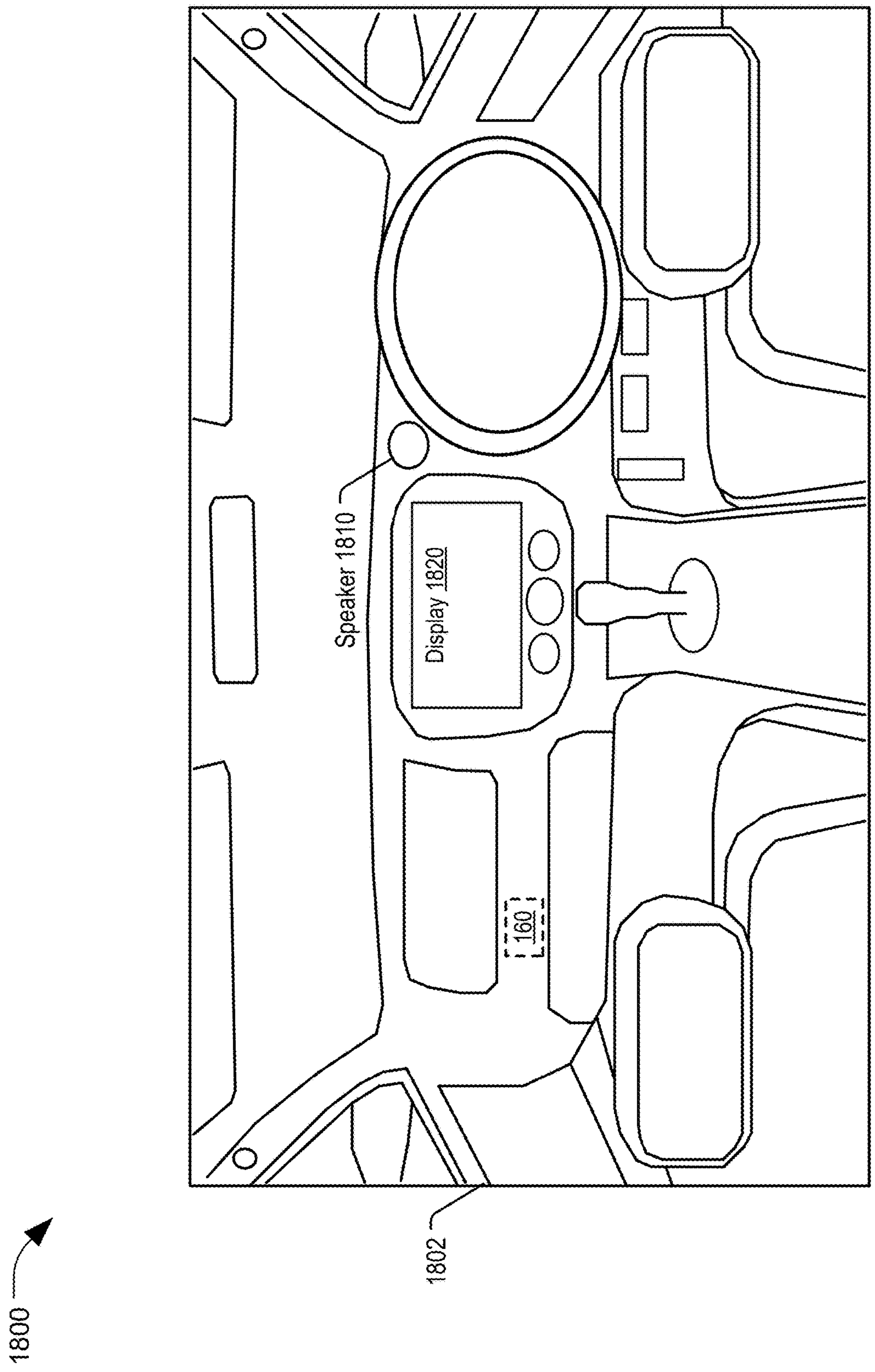
FIG. 18 is a diagram of a second example of a vehicle operable to generate sample data based on joint probability distribution, in accordance with some examples of the present disclosure.

FIG. 10 depicts an implementation 1000 of the device 102 as an integrated circuit 1002 that includes the one or more processors 190. The one or more processors 190 include the sample generation network 160. The integrated circuit 1002 also includes a signal input 1004, such as one or more bus interfaces, to enable input data 1051 to be received for processing. For example, the input data 1051 includes at least a part of the one or more neural network inputs 151 of FIG. 1, the pitch gain 273, the pitch estimation 275, the LPC coefficients 241 of FIG. 2, the encoded audio data 341, the features 343, the conditioning vector 351 of FIG. 3, or a combination thereof. The integrated circuit 1002 also includes a signal output 1006, such as a bus interface, to enable sending of an output signal, such as the sample data 167, the reconstructed audio sample 267, the reconstructed audio signal 271, or a combination thereof. The integrated circuit 1002 enables implementation of generating sample data based on joint probability distribution as a component in a system, such as a mobile phone or tablet as depicted in FIG. 11, a headset as depicted in FIG. 12, a wearable electronic device as depicted in FIG. 13, a voice-controlled speaker system as depicted in FIG. 14, a camera as depicted in FIG. 15, a virtual reality, mixed reality, or augmented reality headset as depicted in FIG. 16, or a vehicle as depicted in FIG. 17 or FIG. 18.

Figure 11:
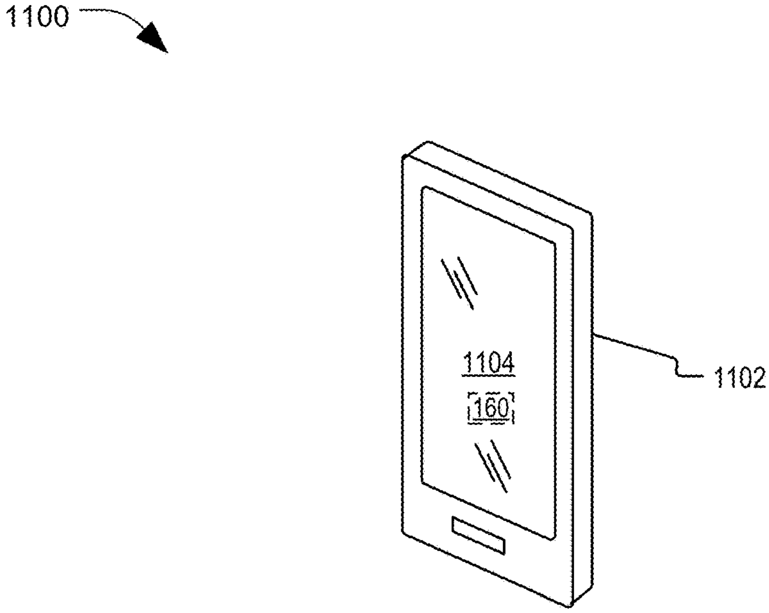
FIG. 11 is a diagram of a mobile device operable to generate sample data based on joint probability distribution, in accordance with some examples of the present disclosure.

FIG. 11 depicts an implementation 1100 in which the device 102 includes a mobile device 1102, such as a phone or tablet, as illustrative, non-limiting examples. The mobile device 1102 includes a display screen 1104. Components of the one or more processors 190, including the sample generation network 160, are integrated in the mobile device 1102 and are illustrated using dashed lines to indicate internal components that are not generally visible to a user of the mobile device 1102. In a particular example, the sample generation network 160 operates to generate the sample data 167 (e.g., the reconstructed audio signal 271), which is then processed to perform one or more operations at the mobile device 1102, such as to launch a graphical user interface or otherwise display other information associated with speech detected in the reconstructed audio signal 271 at the display screen 1104 (e.g., via an integrated "smart assistant" application).

Figure 12:
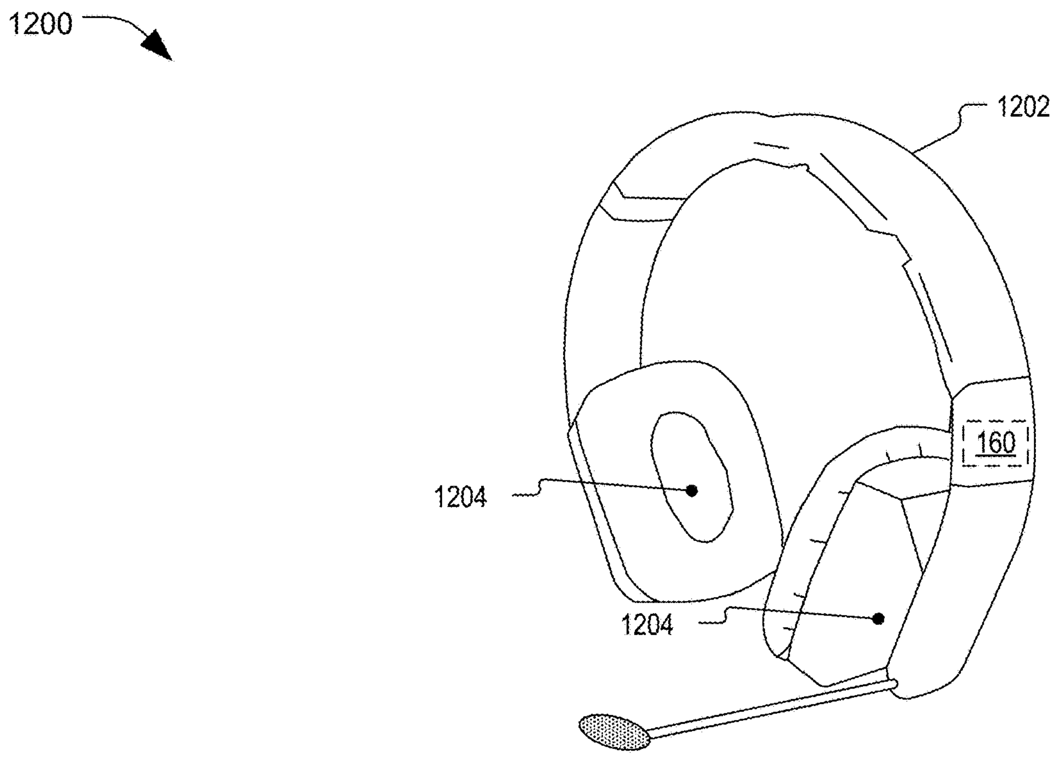
FIG. 12 is a diagram of a headset operable to generate sample data based on joint probability distribution, in accordance with some examples of the present disclosure.

FIG. 12 depicts an implementation 1200 in which the device 102 includes a headset device 1202. Components of the one or more processors 190, including the sample generation network 160, are integrated in the headset device 1202. In a particular example, the sample generation network 160 operates to generate the sample data 167 (e.g., the reconstructed audio signal 271), which may cause the headset device 1202 to output the reconstructed audio signal 271 via one or more speakers 1204, to perform one or more operations at the headset device 1202, to transmit audio data corresponding to voice activity detected in the reconstructed audio signal 271 to a second device (not shown), for further processing, or a combination thereof.

Figure 13:
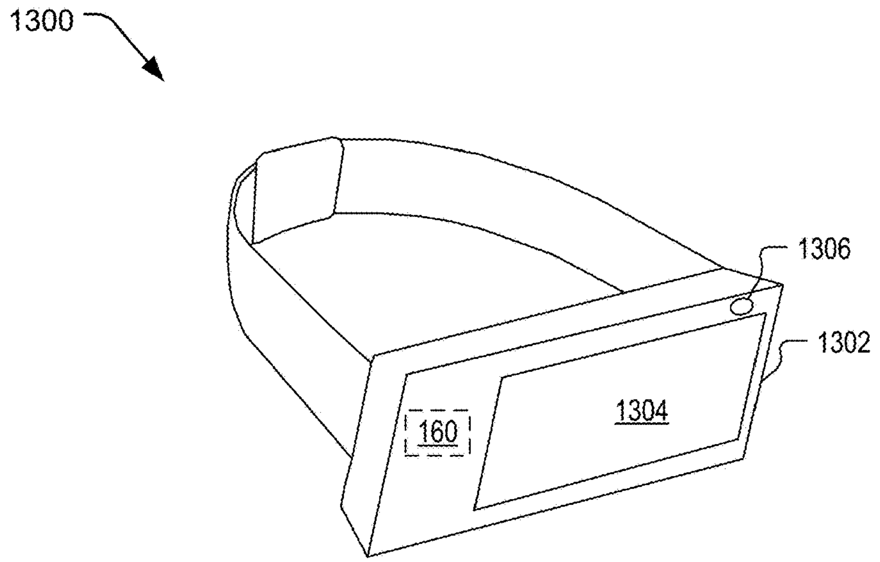
FIG. 13 is a diagram of a wearable electronic device operable to generate sample data based on joint probability distribution, in accordance with some examples of the present disclosure.

FIG. 13 depicts an implementation 1300 in which the device 102 includes a wearable electronic device 1302, illustrated as a "smart watch." The sample generation network 160 is integrated into the wearable electronic device 1302. In a particular example, the sample generation network 160 operates to generate the sample data 167 (e.g., the reconstructed audio signal 271). In some implementations, the wearable electronic device 1302 outputs the reconstructed audio signal 271 via one or more speakers 1306. In some implementations, the sample data 167 is processed to perform one or more operations at the wearable electronic device 1302, such as to launch a graphical user interface or otherwise display other information (e.g., a song title, an artist name, etc.) associated with audio detected in the reconstructed audio signal 271 at a display screen 1304 of the wearable electronic device 1302. To illustrate, the wearable electronic device 1302 may include a display screen that is configured to display a notification based on the audio detected by the wearable electronic device 1302. In a particular example, the wearable electronic device 1302 includes a haptic device that provides a haptic notification (e.g., vibrates) in response to detection of audio. For example, the haptic notification can cause a user to look at the wearable electronic device 1302 to see a displayed notification indicating information (e.g., a song title, an artist name, etc.) associated with the audio.

FIG. 14 is an implementation 1400 in which the device 102 includes a wireless speaker and voice activated device 1402. The wireless speaker and voice activated device 1402 can have wireless network connectivity and is configured to execute an assistant operation. The one or more processors 190 including the sample generation network 160 are included in the wireless speaker and voice activated device 1402. The wireless speaker and voice activated device 1402 also includes a speaker 1404. During operation, the wireless speaker and voice activated device 1402 outputs, via the speaker 1404, the reconstructed audio signal 271 generated via operation of the sample generation network 160. In some implementations, in response to a verbal command identified as user speech in the reconstructed audio signal 271, the wireless speaker and voice activated device 1402 can execute assistant operations, such as via execution of an integrated assistant application. The assistant operations can include adjusting a temperature, playing music, turning on lights, etc. For example, the assistant operations are performed responsive to detecting a command after a keyword or key phrase (e.g., "hello assistant").

FIG. 15 depicts an implementation 1500 in which the device 102 includes a portable electronic device that corresponds to a camera device 1502. The sample generation network 160 is included in the camera device 1502. During operation, the camera device 1502 outputs, via one or more speakers 1504, the reconstructed audio signal 271 generated via operation of the sample generation network 160. In some implementations, in response to detecting a verbal command identified in the reconstructed audio signal 271, the camera device 1502 can execute operations responsive to verbal commands, such as to adjust image or video capture settings, image or video playback settings, or image or video capture instructions, as illustrative examples.

FIG. 16 depicts an implementation 1600 in which the device 102 includes a portable electronic device that corresponds to a virtual reality, mixed reality, or augmented reality headset 1602. The sample generation network 160 is integrated into the headset 1602. In a particular aspect, the headset 1602 outputs, via one or more speakers 1604, the reconstructed audio signal 271 generated via operation of the sample generation network 160. In some implementations, voice activity detection can be performed based on the reconstructed audio signal 271. A visual interface device is positioned in front of the user's eyes to enable display of augmented reality, mixed reality, or virtual reality images or scenes to the user while the headset 1602 is worn. In a particular example, the visual interface device is configured to display a notification indicating audio detected in the reconstructed audio signal 271.

FIG. 17 depicts an implementation 1700 in which the device 102 corresponds to, or is integrated within, a vehicle 1702, illustrated as a manned or unmanned aerial device (e.g., a package delivery drone). The sample generation network 160 is integrated into the vehicle 1702. The vehicle 1702 outputs, via one or more speakers 1704, the reconstructed audio signal 271 generated via operation of the sample generation network 160, such as for assembly instructions or installation instructions for a package recipient.

FIG. 18 depicts another implementation 1800 in which the device 102 corresponds to, or is integrated within, a vehicle 1802, illustrated as a car. The vehicle 1802 includes the one or more processors 190 including the sample generation network 160. Speech recognition can be performed based on the reconstructed audio signal 271 generated via operation of the sample generation network 160. In a particular implementation, the vehicle 1802 outputs, via one or more speakers 1810, the reconstructed audio signal 271 generated via operation of the sample generation network 160. For example, the reconstructed audio signal 271 corresponds to an audio signal received during a phone call with another device. In another example, the reconstructed audio signal 271 corresponds to an audio signal output by an entertainment system of the vehicle 1802. In some examples, the vehicle 1802 provides, via a display 1820, information (e.g., caller identification, song title, etc.) associated with the reconstructed audio signal 271.

Figure 19:
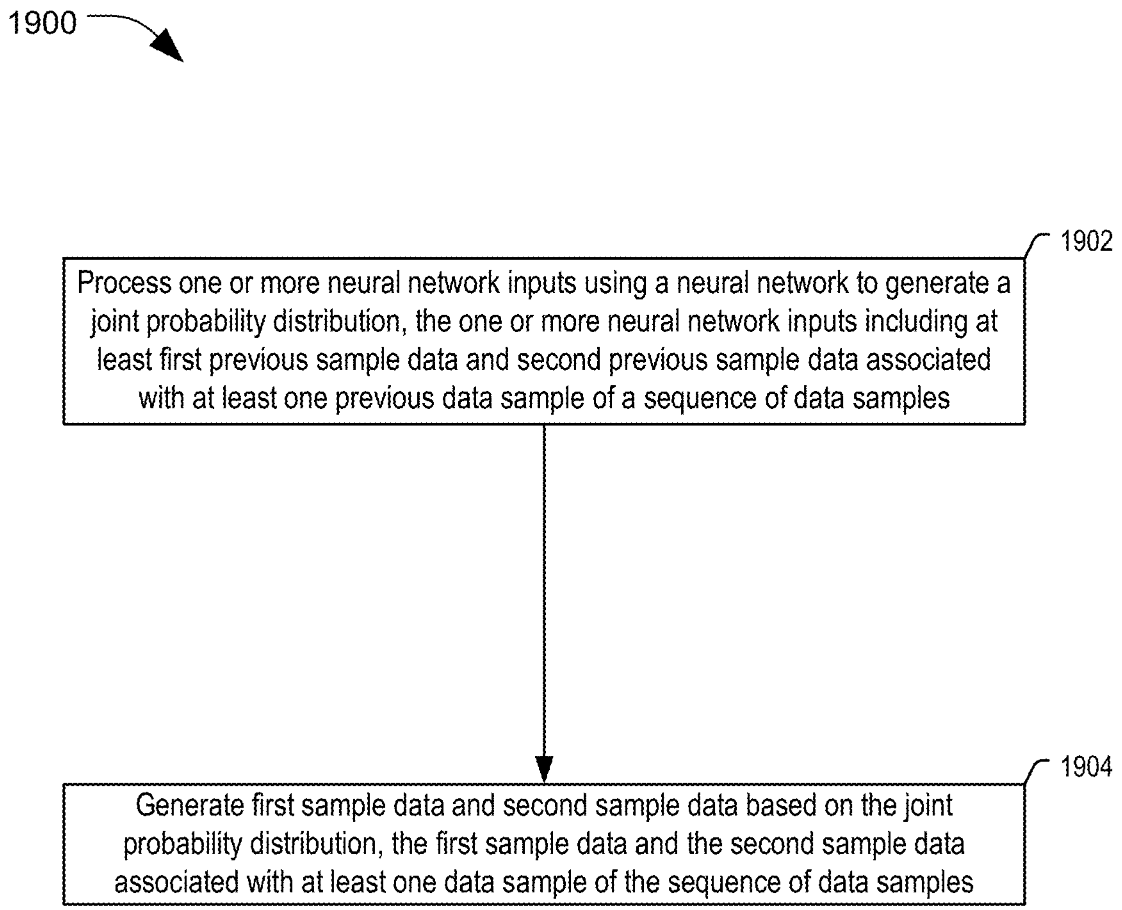
FIG. 19 is diagram of a particular implementation of a method of generating sample data based on joint probability distribution that may be performed by the device of FIG. 1, in accordance with some examples of the present disclosure.

Referring to FIG. 19, a particular implementation of a method 1900 of generating sample data based on joint probability distribution is shown. In a particular aspect, one or more operations of the method 1900 are performed by at least one of the neural network 170, the sample generator 172, the sample generation network 160, the one or more processors 190, the device 102, the system 100 of FIG. 1, or a combination thereof.

The method 1900 includes processing one or more neural network inputs using a neural network to generate a joint probability distribution, the one or more neural network inputs including at least first previous sample data and second previous sample data associated with at least one previous data sample of a sequence of data samples, at 1902. For example, the sample generation network 160 uses the neural network 170 to process the one or more neural network inputs 151 to generate the joint probability distribution 187, as described with reference to FIG. 1. The one or more neural network inputs 151 includes at least the previous sample data 111A and the previous sample data 111B associated with at least one previous data sample of a sequence of data samples. For example, the previous sample data 111A and the previous sample data 111B are associated with at least one previous reconstructed audio sample of the one or more reconstructed audio samples 267, as described with reference to FIG. 2.

The method 1900 also includes generating first sample data and second sample data based on the joint probability distribution, the first sample data and the second sample data associated with at least one data sample of the sequence of data samples, at 1904. For example, the sample generator 172 generates the sample data 167A and the sample data 167B based on the joint probability distribution 187, as described with reference to FIG. 1. The sample data 167A and the sample data 167B are associated with at least one data sample of the sequence of data samples. For example, the sample data 167A and the sample data 167B are associated with at least the reconstructed audio sample 267A of the one or more reconstructed audio samples 267.

The method 1900 thus enables generation of the sample data 167 based on the joint probability distribution 187 that takes account of estimated dependencies between sets of the sample data 167. The resulting sequence of data samples represented by the sample data 167 can be smoother (e.g., have less discontinuity or be less jittery) as compared to data samples that are generated without taking account of such dependencies.

The method 1900 of FIG. 19 may be implemented by a field-programmable gate array (FPGA) device, an application-specific integrated circuit (ASIC), a processing unit such as a central processing unit (CPU), a DSP, a graphics processing unit (GPU), a controller, another hardware device, firmware device, or any combination thereof. As an example, the method 1900 of FIG. 19 may be performed by a processor that executes instructions, such as described with reference to FIG. 20.

Figure 20:
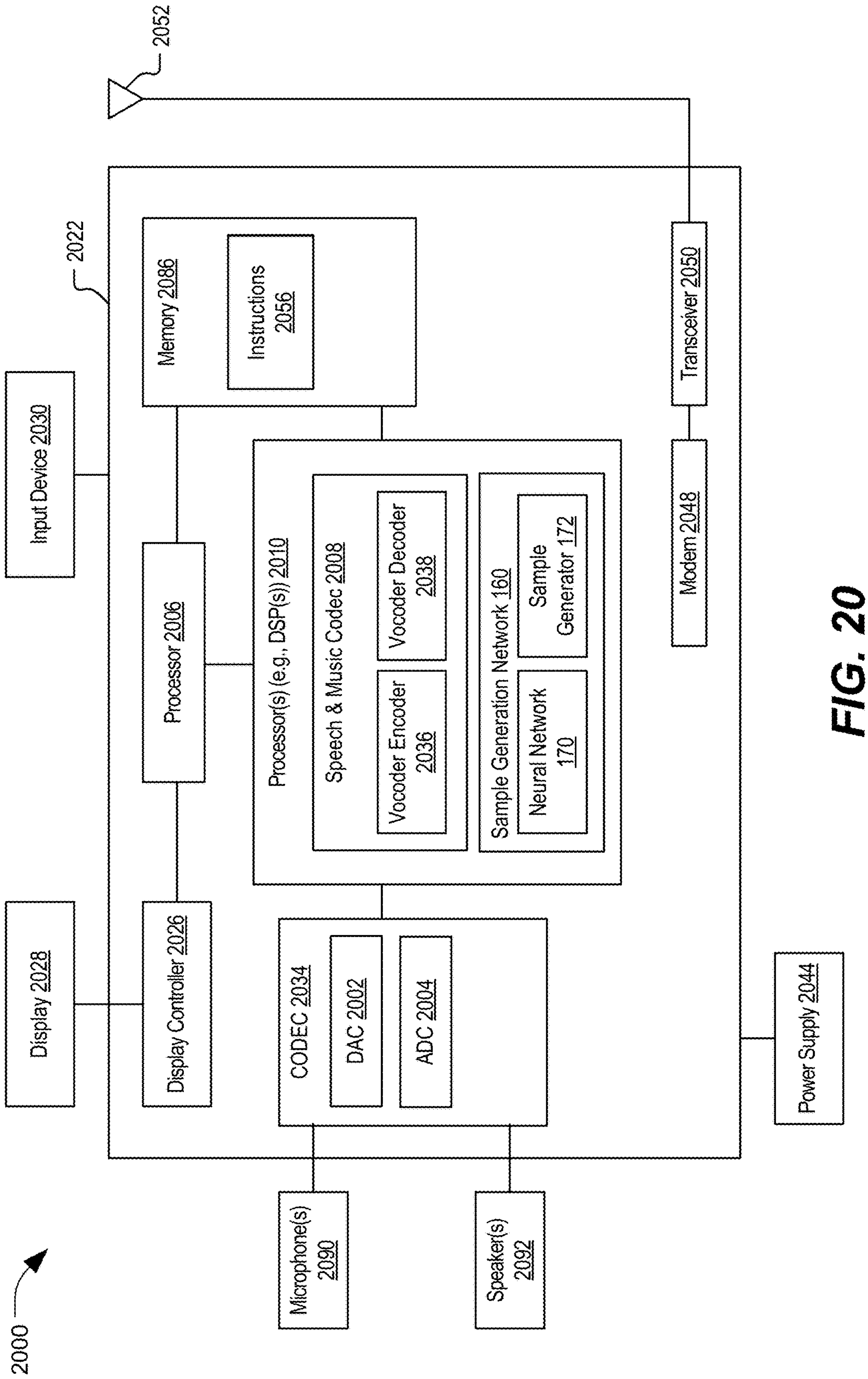
FIG. 20 is a block diagram of a particular illustrative example of a device that is operable to generate sample data based on joint probability distribution, in accordance with some examples of the present disclosure.

Referring to FIG. 20, a block diagram of a particular illustrative implementation of a device is depicted and generally designated 2000. In various implementations, the device 2000 may have more or fewer components than illustrated in FIG. 20. In an illustrative implementation, the device 2000 may correspond to the device 102. In an illustrative implementation, the device 2000 may perform one or more operations described with reference to FIGS. 1-19.

In a particular implementation, the device 2000 includes a processor 2006 (e.g., a CPU). The device 2000 may include one or more additional processors 2010 (e.g., one or more DSPs, one or more GPUs, or a combination thereof). In a particular aspect, the one or more processors 190 of FIG. 1 corresponds to the processor 2006, the processors 2010, or a combination thereof. The processors 2010 may include a speech and music coder-decoder (CODEC) 2008 that includes a voice coder ("vocoder") encoder 2036, a vocoder decoder 2038, or a combination thereof. In a particular aspect, the processors 2010 may include the sample generation network 160. In a particular aspect, the vocoder encoder 2036 may include the encoder 304 of FIG. 3. In a particular aspect, the vocoder decoder 2038 may include the FRAE decoder 240 of FIG. 2.

The device 2000 may include a memory 2086 and a CODEC 2034. The memory 2086 may include instructions 2056, that are executable by the one or more additional processors 2010 (or the processor 2006) to implement the functionality described with reference to the sample generation network 160. The device 2000 may include a modem 2048 coupled, via a transceiver 2050, to an antenna 2052. In a particular aspect, the modem 2048 may correspond to the modem 306, the modem 340 of FIG. 3, or both. In a particular aspect, the transceiver 2050 may include the transmitter 308, the receiver 338 of FIG. 3, or both.

The device 2000 may include a display 2028 coupled to a display controller 2026. One or more speakers 2092, one or more microphones 2090, or a combination thereof, may be coupled to the CODEC 2034. The CODEC 2034 may include a digital-to-analog converter (DAC) 2002, an analog-to-digital converter (ADC) 2004, or both. In a particular implementation, the CODEC 2034 may receive analog signals from the one or more microphones 2090, convert the analog signals to digital signals using the analog-to-digital converter 2004, and provide the digital signals to the speech and music codec 2008. In a particular implementation, the speech and music codec 2008 may provide digital signals to the CODEC 2034. For example, the speech and music codec 2008 may provide the reconstructed audio signal 271 generated by the sample generation network 160 to the CODEC 2034. The CODEC 2034 may convert the digital signals to analog signals using the digital-to-analog converter 2002 and may provide the analog signals to the one or more speakers 2092.

In a particular implementation, the device 2000 may be included in a system-in-package or system-on-chip device 2022. In a particular implementation, the memory 2086, the processor 2006, the processors 2010, the display controller 2026, the CODEC 2034, and the modem 2048 are included in the system-in-package or system-on-chip device 2022. In a particular implementation, an input device 2030 and a power supply 2044 are coupled to the system-in-package or the system-on-chip device 2022. Moreover, in a particular implementation, as illustrated in FIG. 20, the display 2028, the input device 2030, the one or more speakers 2092, the one or more microphones 2090, the antenna 2052, and the power supply 2044 are external to the system-in-package or the system-on-chip device 2022. In a particular implementation, each of the display 2028, the input device 2030, the one or more speakers 2092, the one or more microphones 2090, the antenna 2052, and the power supply 2044 may be coupled to a component of the system-in-package or the system-on-chip device 2022, such as an interface or a controller.

The device 2000 may include a smart speaker, a speaker bar, a mobile communication device, a cellular communication device, a cellular handset, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for processing one or more neural network inputs using a neural network to generate a joint probability distribution, the one or more neural network inputs including at least first previous sample data and second previous sample data associated with at least one previous data sample of a sequence of data samples. For example, the means for processing can correspond to the neural network 170, the sample generation network 160, the one or more processors 190, the device 102, the system 100 of FIG. 1, the audio synthesizer 250, the system 200 of FIG. 2, the system 300 of FIG. 3, the combiner 454, the network 460, the GRU 456A, the GRU 456B, the GRU 456C, the FC layer 484, the softmax layer 486 of FIG. 4A, the processor 2006, the one or more processors 2010, one or more other circuits or components configured to process one or more neural network inputs using a neural network to generate a joint probability distribution, or any combination thereof.

The apparatus also includes means for generating first sample data and second sample data based on the joint probability distribution, the first sample data and the second sample data associated with at least one data sample of the sequence of data samples. For example, the means for generating can correspond to the sample generator 172, the sample generation network 160, the one or more processors 190, the device 102, the system 100 of FIG. 1, the audio synthesizer 250, the system 200 of FIG. 2, the system 300 of FIG. 3, the network 460, the plurality of LP modules 490 of FIG. 4A, the processor 2006, the one or more processors 2010, one or more other circuits or components configured to generate first sample data and second sample data based on a joint probability distribution, or any combination thereof.

In some implementations, a non-transitory computer-readable medium (e.g., a computer-readable storage device, such as the memory 2086) includes instructions (e.g., the instructions 2056) that, when executed by one or more processors (e.g., the one or more processors 2010 or the processor 2006), cause the one or more processors to process one or more neural network inputs (e.g., the one or more neural network inputs 151) using a neural network (e.g., the neural network 170) to generate a joint probability distribution (e.g., the joint probability distribution 187), the one or more neural network inputs including at least first previous sample data (e.g., the previous sample data 111A) and second previous sample data (e.g., the previous sample data 111B) associated with at least one previous data sample of a sequence of data samples (e.g., the one or more reconstructed audio samples 267). The instructions, when executed by the one or more processors, also cause the one or more processors to generate first sample data (e.g., the sample data 167A) and second sample data (e.g., the sample data 167B) based on the joint probability distribution, the first sample data and the second sample data associated with at least one data sample (e.g., the reconstructed audio sample 267) of the sequence of data samples.

Particular aspects of the disclosure are described below in sets of interrelated examples:

According to Example 1, a device includes: a neural network configured to process one or more neural network inputs to generate a joint probability distribution, the one or more neural network inputs including at least first previous sample data and second previous sample data associated with at least one previous data sample of a sequence of data samples; and a sample generator configured to generate first sample data and second sample data based on the joint probability distribution, the first sample data and the second sample data associated with at least one data sample of the sequence of data samples.

Example 2 includes the device of Example 1, wherein the first previous sample data includes first previous audio sample data, wherein the second previous sample data includes second previous audio sample data, wherein the first sample data includes first audio residual data, and wherein the second sample data includes second audio residual data.

Example 3 includes the device of Example 2, wherein the sample generator includes at least one linear prediction (LP) module configured to: generate first reconstructed audio data based on first linear predictive coding (LPC) coefficients and the first audio residual data; and generate second reconstructed audio data based on second LPC coefficients and the second audio residual data, wherein at least one reconstructed audio sample of an audio frame of a reconstructed audio signal is based on the first reconstructed audio data, the second reconstructed audio data, or both.

Example 4 includes the device of Example 3, wherein the second LPC coefficients are the same as the first LPC coefficients.

Example 5 includes the device of Example 3 or Example 4, wherein the at least one LP module is configured to generate the second reconstructed audio data further based on the first reconstructed audio data.

Example 6 includes the device of any of Example 3 to Example 5, wherein the first previous audio sample data corresponds to a first previous reconstructed audio sample of the reconstructed audio signal, the second previous audio sample data corresponds to a second previous reconstructed audio sample of the reconstructed audio signal, the first reconstructed audio data corresponds to a first reconstructed audio sample of the reconstructed audio signal, and the second reconstructed audio data corresponds to a second reconstructed audio sample of the reconstructed audio signal.

Example 7 includes the device of Example 6, wherein the one or more neural network inputs include LP residual data, LP prediction data, or both, associated with the first previous reconstructed audio sample, the second previous reconstructed audio sample, one or more additional previous reconstructed audio samples, or a combination thereof.

Example 8 includes the device of any of Example 3 to Example 5, wherein the first previous audio sample data corresponds to a first previous reconstructed subband audio sample of a first reconstructed subband audio signal, the second previous audio sample data corresponds to a second previous reconstructed subband audio sample of a second reconstructed subband audio signal, the first reconstructed audio data corresponds to a first reconstructed subband audio sample of the first reconstructed subband audio signal, and the second reconstructed audio data corresponds to a second reconstructed subband audio sample of the second reconstructed subband audio signal, and wherein a previous reconstructed audio sample is based at least in part on the first previous reconstructed subband audio sample and the second previous reconstructed subband audio sample.

Example 9 includes the device of Example 8, wherein the second LPC coefficients are distinct from the first LPC coefficients.

Example 10 includes the device of Example 8 or Example 9, wherein the one or more neural network inputs include the first previous reconstructed subband audio sample, the second previous reconstructed subband audio sample, the previous reconstructed audio sample, first previous LP residual data associated with the first previous reconstructed subband audio sample, second previous LP residual data associated with the second previous reconstructed subband audio sample, first LP prediction data associated with the first reconstructed subband audio sample, second LP prediction data associated with the second reconstructed subband audio sample, or a combination thereof.

Example 11 includes the device of any of Example 8 to Example 10, further including a reconstructor configured to generate, based at least in part on the first reconstructed subband audio sample and the second reconstructed subband audio sample, a first reconstructed audio sample of the audio frame.

Example 12 includes the device of Example 11, wherein the reconstructor is further configured to provide the audio frame to a speaker.

Example 13 includes the device of Example 11 or Example 12, wherein the reconstructor includes a subband reconstruction filterbank.

Example 14 includes the device of any of Example 8 to Example 13, wherein the first reconstructed subband audio signal corresponds to at least a first audio subband and the second reconstructed subband audio signal corresponds to at least a second audio subband.

Example 15 includes the device of Example 14, wherein a first particular audio subband corresponds to a first range of frequencies, wherein a second particular audio subband corresponds to a second range of frequencies, wherein the first particular audio subband includes one of the first audio subband, the second audio subband, a third audio subband, or a fourth audio subband, and wherein the second particular audio subband includes another one of the first audio subband, the second audio subband, the third audio subband, or the fourth audio subband.

Example 16 includes the device of Example 15, wherein the first range of frequencies is wider than the second range of frequencies corresponding to the second audio subband.

Example 17 includes the device of Example 15, wherein the first range of frequencies has the same width as the second range of frequencies.

Example 18 includes the device of any of Example 15 to Example 17, wherein the first range of frequencies at least partially overlaps the second range of frequencies.

Example 19 includes the device of any of Example 3 to Example 18, wherein the at least one LP module is configured to generate the first reconstructed audio data further based on long-term linear prediction (LTP) data associated with the first reconstructed audio data, LP data associated with the first reconstructed audio data, previous LP residual data associated with the first previous audio sample data, LP residual data associated with the first reconstructed audio data, or combination thereof.

Example 20 includes the device of any of Example 3 to Example 19, wherein the neural network is configured to generate the joint probability distribution based at least in part on predicted audio data.

Example 21 includes the device of Example 20, wherein the predicted audio data includes long-term linear prediction (LTP) data, LP data, or a combination thereof.

Example 22 includes the device of any of Example 3 to Example 21, wherein the at least one LP module includes a long-term linear prediction (LTP) filter, a short-term LP filter, or both.

Example 23 includes the device of any of Example 3 to Example 22, further including: a modem configured to receive encoded audio data from a second device; and a decoder configured to: decode the encoded audio data to determine features of the audio frame; and estimate at least the first LPC coefficients based on the features.

Example 24 includes the device of any of Example 3 to Example 22, further including: a modem configured to receive encoded audio data from a second device; and a decoder configured to decode the encoded audio data to generate the first LPC coefficients and the second LPC coefficients.

Example 25 includes the device of any of Example 3 to Example 24, wherein the at least one reconstructed audio sample includes a plurality of audio samples.

Example 26 includes the device of any of Example 3 to Example 25, wherein the reconstructed audio signal includes a reconstructed speech signal.

Example 27 includes the device of any of Example 1 to Example 26, wherein the neural network includes an autoregressive (AR) generative neural network.

Example 28 includes the device of any of Example 1 to Example 27, wherein the neural network and the sample generator are integrated into a cellular communication device.

According to Example 29, a method includes: processing one or more neural network inputs using a neural network to generate a joint probability distribution, the one or more neural network inputs including at least first previous sample data and second previous sample data associated with at least one previous data sample of a sequence of data samples; and generating first sample data and second sample data based on the joint probability distribution, the first sample data and the second sample data associated with at least one data sample of the sequence of data samples.

Example 30 includes the method of Example 29, wherein the first previous sample data includes first previous audio sample data, wherein the second previous sample data includes second previous audio sample data, wherein the first sample data includes first audio residual data, and wherein the second sample data includes second audio residual data.

Example 31 includes the method of Example 30, further including: generating, using at least one linear prediction (LP) module, first reconstructed audio data based on first linear predictive coding (LPC) coefficients and the first audio residual data; and generating, using the at least one LP module, second reconstructed audio data based on second LPC coefficients and the second audio residual data, wherein at least one reconstructed audio sample of an audio frame of a reconstructed audio signal is based on the first reconstructed audio data, the second reconstructed audio data, or both.

Example 32 includes the method of Example 31, wherein the second LPC coefficients are the same as the first LPC coefficients.

Example 33 includes the method of Example 31 or Example 32, wherein the second reconstructed audio data is further based on the first reconstructed audio data.

Example 34 includes the method of any of Example 31 to Example 33, wherein the first previous audio sample data corresponds to a first previous reconstructed audio sample of the reconstructed audio signal, the second previous audio sample data corresponds to a second previous reconstructed audio sample of the reconstructed audio signal, the first reconstructed audio data corresponds to a first reconstructed audio sample of the reconstructed audio signal, and the second reconstructed audio data corresponds to a second reconstructed audio sample of the reconstructed audio signal.

Example 35 includes the method of Example 34, wherein the one or more neural network inputs include LP residual data, LP prediction data, or both, associated with the first previous reconstructed audio sample, the second previous reconstructed audio sample, one or more additional previous reconstructed audio samples, or a combination thereof.

Example 36 includes the method of any of Example 31 to Example 33, wherein the first previous audio sample data corresponds to a first previous reconstructed subband audio sample of a first reconstructed subband audio signal, the second previous audio sample data corresponds to a second previous reconstructed subband audio sample of a second reconstructed subband audio signal, the first reconstructed audio data corresponds to a first reconstructed subband audio sample of the first reconstructed subband audio signal, and the second reconstructed audio data corresponds to a second reconstructed subband audio sample of the second reconstructed subband audio signal, and wherein a previous reconstructed audio sample is based at least in part on the first previous reconstructed subband audio sample and the second previous reconstructed subband audio sample.

Example 37 includes the method of Example 36, wherein the second LPC coefficients are distinct from the first LPC coefficients.

Example 38 includes the method of Example 36 or Example 37, wherein the one or more neural network inputs include the first previous reconstructed subband audio sample, the second previous reconstructed subband audio sample, the previous reconstructed audio sample, first previous LP residual data associated with the first previous reconstructed subband audio sample, second previous LP residual data associated with the second previous reconstructed subband audio sample, first LP prediction data associated with the first reconstructed subband audio sample, second LP prediction data associated with the second reconstructed subband audio sample, or a combination thereof.

Example 39 includes the method of any of Example 36 to Example 38, further including generating, based at least in part on the first reconstructed subband audio sample and the second reconstructed subband audio sample, a first reconstructed audio sample of the audio frame.

Example 40 includes the method of Example 39, further including providing the audio frame to a speaker.

Example 41 includes the method of Example 39 or Example 40, further including using a subband reconstruction filterbank to generate the first reconstructed audio sample.

Example 42 includes the method of any of Example 36 to Example 41, wherein the first reconstructed subband audio signal corresponds to at least a first audio subband and the second reconstructed subband audio signal corresponds to at least a second audio subband.

Example 43 includes the method of Example 42, wherein a first particular audio subband corresponds to a first range of frequencies, wherein a second particular audio subband corresponds to a second range of frequencies, wherein the first particular audio subband includes one of the first audio subband, the second audio subband, a third audio subband, or a fourth audio subband, and wherein the second particular audio subband includes another one of the first audio subband, the second audio subband, the third audio subband, or the fourth audio subband.

Example 44 includes the method of Example 43, wherein the first range of frequencies is wider than the second range of frequencies corresponding to the second audio subband.

Example 45 includes the method of Example 43, wherein the first range of frequencies has the same width as the second range of frequencies.

Example 46 includes the method of any of Example 43 to Example 45, wherein the first range of frequencies at least partially overlaps the second range of frequencies.

Example 47 includes the method of any of Example 31 to Example 46, further including generating, at the at least one LP module, the first reconstructed audio data further based on long-term linear prediction (LTP) data associated with the first reconstructed audio data, LP data associated with the first reconstructed audio data, previous LP residual data associated with the first previous audio sample data, LP residual data associated with the first reconstructed audio data, or combination thereof.

Example 48 includes the method of any of Example 31 to Example 47, wherein the neural network is configured to generate the joint probability distribution based at least in part on predicted audio data.

Example 49 includes the method of Example 48, wherein the predicted audio data includes long-term linear prediction (LTP) data, LP data, or a combination thereof.

Example 50 includes the method of any of Example 31 to Example 49, wherein the at least one LP module includes a long-term linear prediction (LTP) filter, a short-term LP filter, or both.

Example 51 includes the method of any of Example 31 to Example 50, further including: receiving encoded audio data via a modem from a second device; decoding, at a decoder, the encoded audio data to determine features of the audio frame; and estimating at least the first LPC coefficients based on the features.

Example 52 includes the method of any of Example 31 to Example 50, further including: receiving encoded audio data at a modem from a second device; and decoding, at a decoder, the encoded audio data to generate the first LPC coefficients and the second LPC coefficients.

Example 53 includes the method of any of Example 31 to Example 52, wherein the at least one reconstructed audio sample includes a plurality of audio samples.

Example 54 includes the method of any of Example 31 to Example 53, wherein the reconstructed audio signal includes a reconstructed speech signal.

Example 55 includes the method of any of Example 29 to Example 54, wherein the neural network includes an autoregressive (AR) generative neural network.

Example 56 includes the method of any of Example 29 to Example 55, further including: generating, using at least one LP module, first reconstructed audio data based on first linear predictive coding (LPC) coefficients and first audio residual data, wherein the first sample data includes the first audio residual data; and generating, using the at least one LP module, second reconstructed audio data based on second LPC coefficients and second audio residual data, wherein the second sample data includes the second audio residual data, and wherein at least one reconstructed audio sample of an audio frame of a reconstructed audio signal is based on the first reconstructed audio data, the second reconstructed audio data, or both.

According to Example 57, a device includes: a memory configured to store instructions; and a processor configured to execute the instructions to perform the method of any of Example 29 to 56.

According to Example 58, a non-transitory computer-readable medium stores instructions that, when executed by a processor, cause the processor to perform the method of any of Example 29 to Example 56.

According to Example 59, an apparatus includes means for carrying out the method of any of Example 29 to Example 56.

Example 60 includes a non-transitory computer-readable medium storing instructions that, when executed by one or more processors, cause the one or more processors to: process one or more neural network inputs using a neural network to generate a joint probability distribution, the one or more neural network inputs including at least first previous sample data and second previous sample data associated with at least one previous data sample of a sequence of data samples; and generate first sample data and second sample data based on the joint probability distribution, the first sample data and the second sample data associated with at least one data sample of the sequence of data samples.

Example 61 includes the non-transitory computer-readable medium of Example 60, wherein the instructions, when executed by the one or more processors, cause the one or more processors to: generate, using at least one linear prediction (LP) module, first reconstructed audio data based on first linear predictive coding (LPC) coefficients and first audio residual data, wherein the first sample data includes the first audio residual data; and generate, using the at least one LP module, second reconstructed audio data based on second LPC coefficients and second audio residual data, wherein the second sample data includes the second audio residual data, and wherein at least one reconstructed audio sample of an audio frame of a reconstructed audio signal is based on the first reconstructed audio data, the second reconstructed audio data, or both.

Example 62 includes an apparatus including: means for processing one or more neural network inputs using a neural network to generate a joint probability distribution, the one or more neural network inputs including at least first previous sample data and second previous sample data associated with at least one previous data sample of a sequence of data samples; and means for generating first sample data and second sample data based on the joint probability distribution, the first sample data and the second sample data associated with at least one data sample of the sequence of data samples.

Example 63 includes the apparatus of Example 62, wherein the means for processing and the means for generating are integrated into at least one of a smart speaker, a speaker bar, a computer, a tablet, a display device, a television, a gaming console, a music player, a radio, a digital video player, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a communication device, a cellular communication device, an internet-of-things (IoT) device, a virtual reality (VR) device, a base station, or a mobile device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

a neural network configured to process one or more neural network inputs to generate a joint probability distribution, the one or more neural network inputs including at least first previous sample data and second previous sample data associated with at least one previous data sample of a sequence of data samples; and a sample generator configured to:

generate first sample data and second sample data based on the joint probability distribution, the first sample data and the second sample data associated with at least one data sample of the sequence of data samples;

generate first reconstructed audio data based at least in part on the first sample data; and generate second reconstructed audio data based at least in part on the second sample data, wherein:

a reconstructed audio sample of an audio frame of a reconstructed audio signal is based at least in part on a first reconstructed subband audio sample of a first reconstructed subband audio signal and a second reconstructed subband audio sample of a second reconstructed subband audio signal, the first reconstructed subband audio sample is based on the first reconstructed audio data, and the second reconstructed subband audio sample is based on the second reconstructed audio data.

2. The device of claim 1, wherein the sample generator comprises at least one linear prediction (LP) module configured to:

generate the first reconstructed audio data based on first linear predictive coding (LPC) coefficients and the first sample data, and generate the second reconstructed audio data based on second LPC coefficients and the second sample data.

3. The device of claim 2, wherein the second LPC coefficients are the same as the first LPC coefficients.

4. The device of claim 1, wherein the one or more neural network inputs include linear prediction (LP) residual data, LP prediction data, or both, associated with a first previous reconstructed audio sample of the reconstructed audio signal, a second previous reconstructed audio sample of the reconstructed audio signal, one or more additional previous reconstructed audio samples, or a combination thereof.

5. The device of claim 1, wherein;

the first previous sample data corresponds to a first previous reconstructed subband audio sample of the first reconstructed subband audio signal, the second previous sample data corresponds to a second previous reconstructed subband audio sample of the second reconstructed subband audio signal, a previous reconstructed audio sample is based at least in part on the first previous reconstructed subband audio sample and the second previous reconstructed subband audio sample.

6. The device of claim 1, wherein:

the first previous sample data is included in a first sequence of sample data, the second previous sample data is included in a second sequence of sample data, the joint probability distribution indicates probabilities of potential values of the first sample data of the first sequence of sample data and the second sample data of the second sequence of sample data, and the sample generator is configured to generate the first sample data and the second sample data based on the probabilities of the potential values indicated in the joint probability distribution.

7. The device of claim 5, wherein the one or more neural network inputs include the first previous reconstructed subband audio sample, the second previous reconstructed subband audio sample, the previous reconstructed audio sample, first previous linear prediction (LP) residual data associated with the first previous reconstructed subband audio sample, second previous LP residual data associated with the second previous reconstructed subband audio sample, first LP prediction data associated with the first reconstructed subband audio sample, second LP prediction data associated with the second reconstructed subband audio sample, or a combination thereof.

8. The device of claim 1, further comprising a reconstructor configured to generate, based at least in part on the first reconstructed subband audio sample and the second reconstructed subband audio sample, a first reconstructed audio sample of the audio frame.

9. The device of claim 8, wherein the reconstructor is further configured to provide the audio frame to a speaker.

10. The device of claim 8, wherein the reconstructor includes a subband reconstruction filterbank.

11. The device of claim 1, wherein the first reconstructed subband audio signal corresponds to at least a first audio subband and the second reconstructed subband audio signal corresponds to at least a second audio subband.

12. The device of claim 11, wherein a first particular audio subband corresponds to a first range of frequencies, wherein a second particular audio subband corresponds to a second range of frequencies, wherein the first particular audio subband includes one of the first audio subband, the second audio subband, a third audio subband, or a fourth audio subband, and wherein the second particular audio subband includes another one of the first audio subband, the second audio subband, the third audio subband, or the fourth audio subband.

13. The device of claim 12, wherein the first range of frequencies is wider than the second range of frequencies corresponding to the second audio subband.

14. The device of claim 12, wherein the first range of frequencies has the same width as the second range of frequencies.

15. The device of claim 12, wherein the first range of frequencies at least partially overlaps the second range of frequencies.

16. The device of claim 2, wherein the at least one LP module is configured to generate the first reconstructed audio data further based on long-term linear prediction (LTP) data associated with the first reconstructed audio data, LP data associated with the first reconstructed audio data, previous LP residual data associated with the first previous sample data, LP residual data associated with the first reconstructed audio data, or a combination thereof.

17. The device of claim 2, further comprising:

a modem configured to receive encoded audio data from a second device; and a decoder configured to decode the encoded audio data to generate the first LPC coefficients and the second LPC coefficients.

18. The device of claim 1, wherein the neural network includes an autoregressive (AR) generative neural network.

19. A method comprising:

processing one or more neural network inputs using a neural network to generate a joint probability distribution, the one or more neural network inputs including at least first previous sample data and second previous sample data associated with at least one previous data sample of a sequence of data samples;

generating first sample data and second sample data based on the joint probability distribution, the first sample data and the second sample data associated with at least one data sample of the sequence of data samples;

generating first reconstructed audio data based at least in part on the first sample data; and generating second reconstructed audio data based at least in part on the second sample data, wherein:

a reconstructed audio sample of an audio frame of a reconstructed audio signal is based at least in part on a first reconstructed subband audio sample of a first reconstructed subband audio signal and a second reconstructed subband audio sample of a second reconstructed subband audio signal, the first reconstructed subband audio sample is based on the first reconstructed audio data, and the second reconstructed subband audio sample is based on the second reconstructed audio data.

20. A non-transitory computer-readable medium storing instructions that, when executed by one or more processors, cause the one or more processors to:

process one or more neural network inputs using a neural network to generate a joint probability distribution, the one or more neural network inputs including at least first previous sample data and second previous sample data associated with at least one previous data sample of a sequence of data samples;

generate first sample data and second sample data based on the joint probability distribution, the first sample data and the second sample data associated with at least one data sample of the sequence of data samples generate first reconstructed audio data based at least in part on the first sample data; and generate second reconstructed audio data based at least in part on the second sample data, wherein:

a reconstructed audio sample of an audio frame of a reconstructed audio signal is based at least in part on a first reconstructed subband audio sample of a first reconstructed subband audio signal and a second reconstructed subband audio sample of a second reconstructed subband audio signal, the first reconstructed subband audio sample is based on the first reconstructed audio data, and the second reconstructed subband audio sample is based on the second reconstructed audio data.

* * * * *